(12) United States Patent
Stone et al.

(10) Patent No.: US 8,392,896 B2
(45) Date of Patent: Mar. 5, 2013

(54) SOFTWARE TEST BED GENERATION

(75) Inventors: Raymond L. Stone, Bothell, WA (US); Christopher A. Cubley, Snoqualmie, WA (US); Ashvin J. Sanghvi, Sammamish, WA (US); Albert Greenberg, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1010 days.

(21) Appl. No.: 12/399,058

(22) Filed: Mar. 6, 2009

(65) Prior Publication Data

US 2010/0229150 A1 Sep. 9, 2010

(51) Int. Cl.
G06F 9/45 (2006.01)
(52) U.S. Cl. .................................................. 717/140
(58) Field of Classification Search .................. 717/124, 717/104
See application file for complete search history.

(56) References Cited

U.S. PATENT DOCUMENTS

| | | | |
|---|---|---|---|
| 6,389,409 B1 | 5/2002 | Horovitz et al. | |
| 6,615,166 B1 * | 9/2003 | Guheen et al. | 703/27 |
| 6,931,418 B1 | 8/2005 | Barnes | |
| 7,152,039 B1 | 12/2006 | Cheng et al. | |
| 7,184,504 B2 * | 2/2007 | Menkhoff | 375/355 |
| 7,343,355 B2 * | 3/2008 | Ivanov et al. | 705/400 |
| 7,694,272 B2 * | 4/2010 | Bronicki et al. | 717/109 |
| 2003/0120688 A1 | 6/2003 | Hill et al. | |
| 2006/0117320 A1 | 6/2006 | Garms et al. | |
| 2006/0253431 A1 | 11/2006 | Bobick et al. | |
| 2007/0044067 A1 * | 2/2007 | Feldman | 717/104 |
| 2007/0109018 A1 | 5/2007 | Perl et al. | |
| 2008/0140549 A1 | 6/2008 | Eder | |
| 2008/0162207 A1 * | 7/2008 | Gross et al. | 705/7 |
| 2009/0106011 A1 | 4/2009 | Chen et al. | |
| 2009/0138436 A1 | 5/2009 | Halberstadt et al. | |
| 2010/0131916 A1 * | 5/2010 | Prigge | 717/104 |
| 2010/0153432 A1 * | 6/2010 | Pfeifer et al. | 707/769 |

FOREIGN PATENT DOCUMENTS

JP 2004513417 A 4/2004

OTHER PUBLICATIONS

"International Search Report", Mailed Date: Sep. 17, 2010, Application No. PCT/US2010/025681, Filed Date: Feb. 26, 2010, pp. 9.
Chicco, et al., "Comparisons among Clustering Techniques for Electricity Customer Classification", Retrieved at <<http://ieeexplore.ieee.org/stamp/stamp.jsp?arnumber=01626400>>, IEEE Transactions on Power Systems, vol. 21, No. 2, May 2006, pp. 933-940.
Dutt, et al., "The Concept of Classification in Data Mining using Neural Networks", Retrieved at <<http://www.andrew.cmu.edu/user/vdutt/Camera_Ready_Paper_For_NCBC_05.pdf>>, pp. 1-6.
Barros, Oscar, "Business Process Patterns and Frameworks: Reusing Knowledge in Process Innovation", Retrieved at <<http://www.dii.uchile.cl/~ceges/publicaciones/ceges65.pdf>>, pp. 1-26.

* cited by examiner

Primary Examiner — Don Wong
Assistant Examiner — Mohammad Kabir

(57) ABSTRACT

A system and method is described for generating a test bed that is useful in developing, testing and/or supporting the use of software, such as software used for managing IT processes and/or monitoring equipment in an enterprise network. The system and method operates by processing a manifest to generate an instance space model of a computer network, wherein the manifest refers to a type space model of a computer network and includes an encoding that conveys parameters that are used to inflate the type space model of the computer network into the instance space model of the computer network. The type space model may comprise an object-relational directed graph that describes a plurality of potential directed graph instances and the instance space model may comprise one of the plurality of potential directed graph instances.

20 Claims, 7 Drawing Sheets

SOFTWARE TEST BED GENERATION

BACKGROUND

Software products and programs (generally, "software") are being developed and published that enable network managers and administrators to coordinate information technology (IT) processes and/or automatically monitor the health of equipment in an enterprise network. Once installed, such software may generate and store data describing the actual entities in an enterprise network and the relationships between them as well as data pertaining to the operations of such entities. To develop, test and support the use of such software for a particular enterprise or enterprise type, it is important to be able to run the software against test data that reasonably represents the volume and content of data that would be generated by the software if it was installed by an actual enterprise.

One approach to obtaining such data is to obtain it from the enterprise itself after the software has been installed and used for some time. However, many enterprises may not be comfortable with this approach due to privacy concerns about how the data will be handled and also because collection of such data may require an expenditure of time and/or money by the enterprise. Even in instances where an enterprise is willing to share such data, there may be technical reasons why such data, or certain subsets of such data, cannot be obtained and/or used for testing by a software developer. Peculiarities in data obtained from specific enterprises may also render such data unsuitable for mainstream testing.

If the software has not yet been published or if an enterprise is not willing or able to share data generated by the software, then the test data cannot be obtained directly from the enterprise. In this case, some approach must be taken by the developer to generate the test data. Given the volume of data that is typically needed, manual generation is not a feasible approach. Therefore, some automated approach must be used. Although automated test data generators are capable of producing high volumes of test data, they tend to be limited in that they cannot generate rich and varied test data that fairly represents the kind of data that would be produced by the software when installed by an actual enterprise.

Another challenge associated with generating test data involves accurately modeling the test data for a certain enterprise or enterprise type, since IT infrastructures vary widely. Conventionally, the problem of classifying an enterprise is often handled in a very coarse manner by placing the enterprise in a predefined class (e.g., small, mid-market, global) and then making assumptions about each class that are to some extent arbitrary and disconnected from factual data. Another approach to classification involves requiring a representative of an enterprise to complete a detailed survey that is used to classify the enterprise along various dimensions (e.g., size, enterprise topology, use of various technologies, industry vertical, multi-national or regional, language, Internet or internal facing, rate of technology adoption, etc.). However, it is often difficult to correlate such information to parameters that are useful in generating representative test data for the enterprise. Furthermore, when answering the survey, the representative often does not know the enterprise well enough to provide accurate answers.

What is needed then is a system and method for generating a test bed that is useful in developing, testing, and/or supporting the use of software, such as software used for managing IT processes and/or monitoring equipment in an enterprise network. The system and method should preferably enable large volumes of realistic and rich test data to be generated for a particular enterprise or enterprise type in an automated fashion, wherein such test data fairly represents the kind of data that would be produced by the software when installed by the particular enterprise or enterprise type.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A system and method is described herein for generating a test bed that is useful in developing, testing and/or supporting the use of software, such as software used for managing IT processes and/or monitoring equipment in an enterprise network. The system and method enables large volumes of realistic and rich test data to be generated for a particular enterprise or enterprise type in an automated fashion, wherein such test data fairly represents the kind of data that would be produced by the software when installed by the particular enterprise or enterprise type.

In particular, a computer-implemented method for generating a test bed for developing, testing, and/or supporting the use of software is described herein. In accordance with the method, a manifest is received. The manifest refers to a type space model of a computer network, the type space model including hardware, software, network and storage entity types, and includes an encoding that conveys parameters that can be used to inflate the type space model of the computer network into an instance space model of the computer network. The manifest is then processed to create an instance space model of the computer network. Data representative of the instance space model is stored to a physical storage medium.

Depending upon the implementation, the type space model may also comprise process data entities.

In one embodiment, the encoding conveys cardinality information that specifies a particular number of entity type instances or relationship type instances to be generated in creating the instance space model. The encoding may also convey property information that specifies a property to be associated with an entity type instance generated in creating the instance space model.

In a particular embodiment, the type space model comprises an object-relational directed graph that describes a plurality of potential directed graph instances and the instance space model comprises one of the plurality of potential directed graph instances.

A computer-implemented method for generating a manifest is also described herein. The manifest refers to a type space model of a computer network, the type space model including hardware, software, network and storage entity types, and includes an encoding that conveys parameters that can be used to inflate the type space model of the computer network into an instance space model of the computer network. In accordance with the method, information is collected about an enterprise network using a network-management software product. One or more parameters to be conveyed by the encoding included in the manifest are extracted from the collected information. The extracted parameter(s) are then used to generate the manifest.

In one embodiment, the foregoing method further includes performing the collecting, extracting and using steps with respect to a plurality of different enterprise networks associated with a plurality of different enterprises to generate a plurality of manifests and combining two or more of the plurality of manifests to create an archetype manifest. In a particular implementation, combining two or more of the plurality of manifests to create an archetype manifest includes clustering the plurality of manifests based on the parameters conveyed by the encoding in each of the manifests to generate one or more clusters of manifests and creating an archetype manifest associated with at least one cluster based on the parameters conveyed by the encoding in each of the manifests included in the cluster. A system for generating a test bed for developing, testing and/or supporting the use of software is also described herein. The system includes a type space definition processor, an entity engine and a database write action module. The type space definition processor is configured to receive a manifest and to obtain therefrom a type space model of a computer network and parameters that can be used to inflate the type space model of the computer network into an instance space model of the computer network, wherein the type space model includes hardware, software, network and storage entity types. The entity engine is configured to process the type space model and the parameters to create an instance space model of the computer network. The database write action module is configured to store data representative of the instance space model to a physical storage medium.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
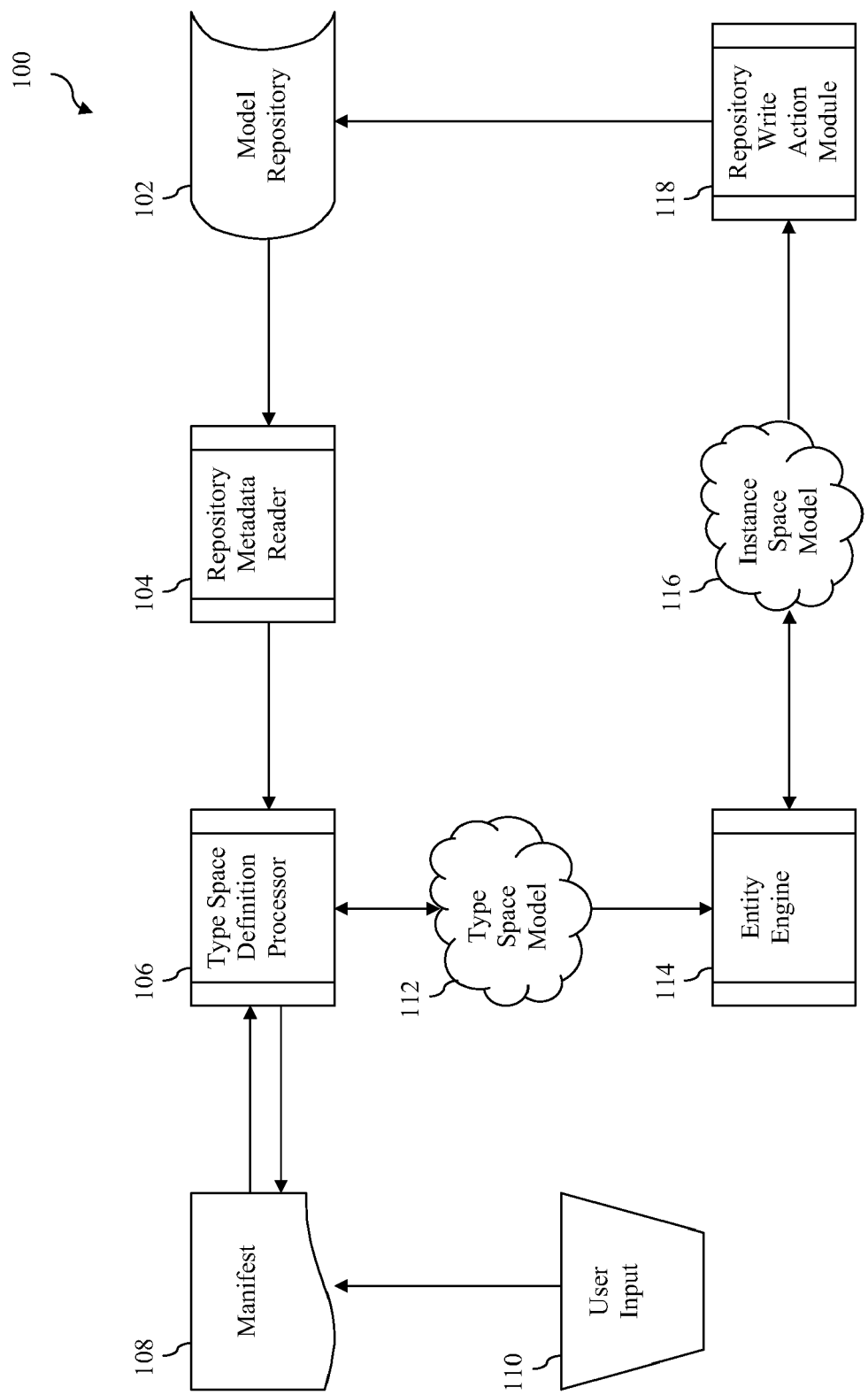
FIG. 1 is a block diagram of an example test bed generation system in accordance with an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

A. Test Data Generation System and Method

FIG. 1 is a block diagram of an example test data generation system 100 in accordance with an embodiment of the present invention. Example test data generation system 100 may advantageously be used to generate a test bed for developing, testing and/or supporting the use of a software product or program. For example, test data generation system 100 may be used to generate a test bed that may be used for developing, testing and/or supporting the use of a software product or program used for performing network management functions, wherein such functions may include but are not limited to managing IT processes and/or monitoring equipment in an enterprise network. In one specific embodiment, test data generation system 100 is used to generate test discovery data for developing, testing and/or supporting the use of a version of MICROSOFT SYSTEM CENTER SERVICE MANAGER or a version of MICROSOFT SYSTEM CENTER OPERATIONS MANAGER, each of which is published by Microsoft Corporation of Redmond, Wash. However, these products are mentioned by way of example only and system 100 may be used to generate test data for various other software products or programs.

As shown in FIG. 1, system 100 includes a number of elements and processes, each of which will be described below. In one embodiment, each of the processes shown in FIG. 1 is implemented as software that may be executed by a processor-based computer system, such as example processor-based computer system 900 described below in reference to FIG. 9. In one implementation, all the software-implemented processes are executed by a single computer system. Alternatively, different software-implemented processes may be executed by different computer systems and data may be communicated between the different processes via a network or some other channel.

Model repository 102 comprises a database or some other structured collection of data that may be used to store test data generated by system 100. Prior to execution of any of the processes of system 100, model repository 102 is populated with metadata that describes the types of instance entities that may exist in model repository 102 in order for the rest of the system under test to function properly. Instance entities may include for example hardware, software, network and storage entities. This metadata may be thought of as one manner of describing a "type space model" of an enterprise network. In one embodiment, database 102 comprises a database that is created through the installation of a version of MICROSOFT SYSTEM CENTER OPERATIONS MANAGER on a computer system. In further accordance with this embodiment, the metadata describing the type space model is embodied in one or more management packs that are loaded into model repository 102 as part of the installation process and/or subsequent to the installation process.

Repository metadata reader 104 is a process that is configured to extract the metadata describing the type space model stored in repository 102 and provide it to type space definition processor 106.

Type space definition processor 106 is configured, in part, to receive the extracted metadata describing the type space model from repository metadata reader 104 and to process the extracted metadata to generate a manifest 108 that refers to the type space model. Manifest 108 may be formatted such that it can be easily read and annotated by a user using a computer-implemented user interface tool. In one embodiment, manifest 108 comprises an Extensible Markup Language (XML) document, although this is only one example.

In accordance with one implementation, a user manually annotates manifest 108 to add certain encoded parameters thereto. In FIG. 1, such manual annotation is generally represented by user input block 110. As will be described in more detail herein, the encoded parameters added to manifest 108 are used by entity engine 114 to convert the type space model referred to by manifest 108 into a memory-instantiated model of a particular enterprise network, which is also referred to herein as an "instance space model." For example, whereas the type space model may describe all the types of entities that can exist within an enterprise network, the encoded parameters added by the user may specify how many instances of those entity types should actually exist within a particular instance space model. The encoded parameters may also specify properties that should be associated with each entity instance. For example, property rules may be specified that can be used to determine a property value to be associated with one or more entity instances. As another example, whereas the type space model may describe all the types of relationships that can exist between entity types in an enterprise network, the encoded parameters added by the user may specify how many instances of those relationship types should actually exist within a particular instance space model.

In an embodiment, the encoded parameters added by the user to manifest 108 include cardinality information that specify a particular number of entity type instances and relationship type instances to be generated by entity engine 114 in creating the instance space model. The encoded parameters added by the user to manifest 108 may also include property information that specifies properties to be associated with various entity instances generated by entity engine 114 in creating the instance space model.

Type space definition processor 106 is further configured to receive the annotated manifest 108 and to create a type space model 112 of an enterprise network in memory based on the manifest. In an embodiment, type space model 112 comprises an object model of the type space model referred to by manifest 108 that is suitable for processing by entity engine 114. This object model may be obtained, for example, by de-serializing annotated manifest 108. Type space model 112 also incorporates the parameters introduced to manifest 108 as part of the annotation process. In an embodiment, type space definition processor 106 may operate to convert one or more of these parameters from a format used in the manifest (e.g., a string format) to another format (e.g., an integer value) for incorporation within type space model 112.

Entity engine 114 is configured to read type space model 112 and to create an instance space model 116 of a particular enterprise network based on type space model 112 and the parameters incorporated therein. For example, entity engine 114 may generate instance space model 116 by creating 0-n instances of each entity and relationship type included within type space model 112 in accordance with cardinality information incorporated within type space model 112. As another example, entity engine 114 may create instance space model 116 by associating properties with various entity instances in accordance with property rules incorporated within type space model 112.

As will be discussed in more detail herein with respect to a specific implementation of the present invention, entity engine 114 may generate instance space model 116 in a deterministic or non-deterministic fashion depending upon the manner in which manifest 108 is annotated.

Once instance space model 116 has been created by entity engine 114, repository write action module 118 operates to write instance space model 116 to model repository 102. This process comprises storing data representative of instance space model 116 to a physical storage medium. In one embodiment, the process of storing the data representative of instance space model 116 to a physical storage medium may be divided into multiple cycles. In each cycle, a portion of the data representing instance space model 116 is received from entity engine 114 and then stored to model repository 102 by repository write action module 118. Such an implementation may be desirable where the amount of memory available for storing the data representative of the instance space model is limited.

Though not shown in FIG. 1, system 100 may also include one or more optional plug-in modules. The plug-in module(s) may be used in conjunction with entity engine 114 and repository write action module 118 to modify and/or augment the operation of one or both of those elements. In one embodiment, at least one plug-in module is used to cause the data storage operations of repository write action module 118 to be divided into multiple cycles as previously described. The plug-in module(s) may further be used to modify and/or augment the manner by which entity engine 114 creates instance space model 116 or by which repository write action module 118 writes data representative of instance space model 116 to a physical storage medium.

Figure 2:
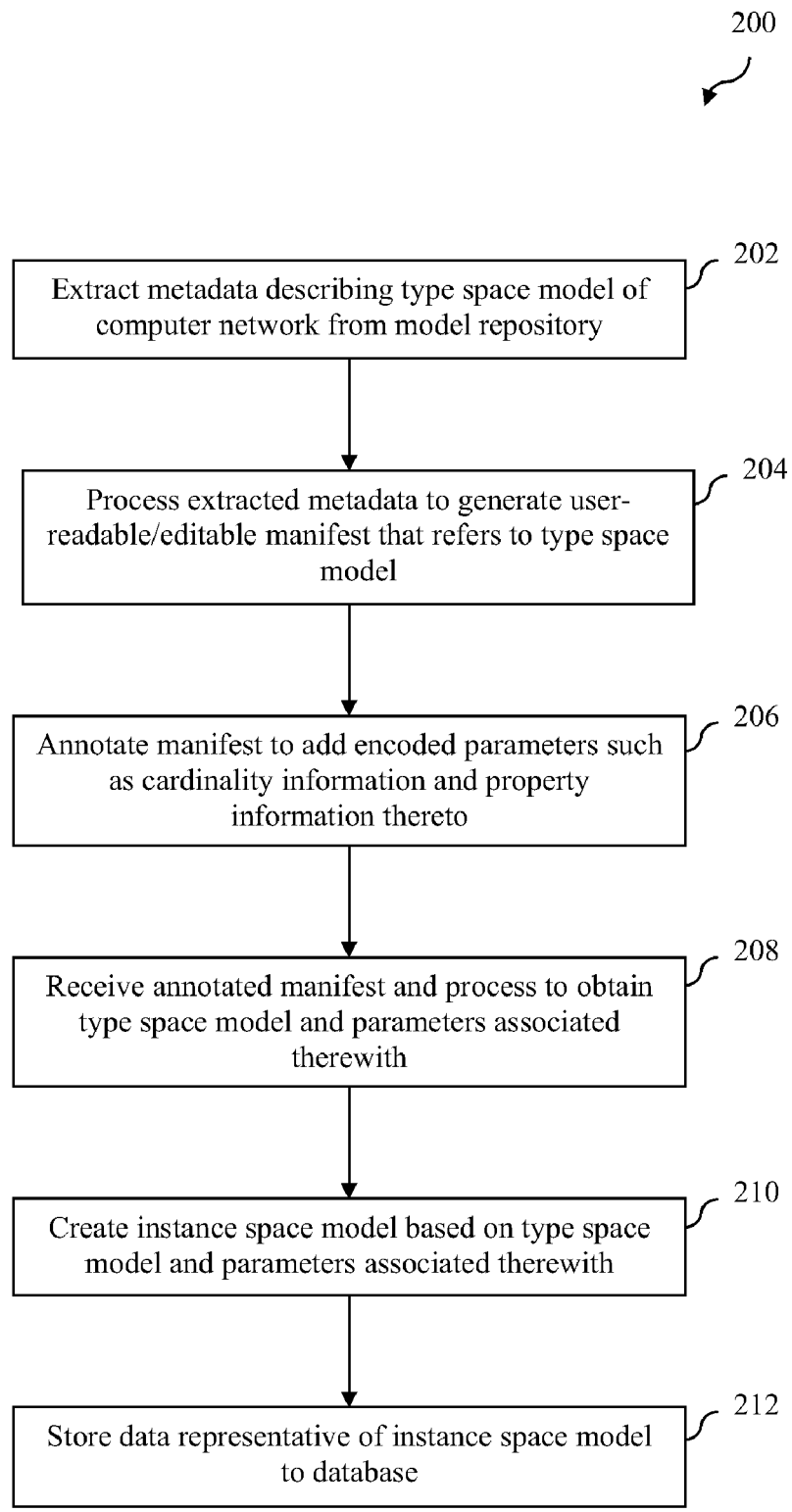
FIG. 2 depicts a flowchart of a method for generating a test bed in accordance with an embodiment of the present invention.

FIG. 2 depicts a flowchart 200 of a method for generating a test bed in accordance with an embodiment of the present invention. The method of flowchart 200 will now be described with continued reference to the elements of system 100 as described above in reference to FIG. 1. However, the method is not limited to that implementation.

As shown in FIG. 2, the method of flowchart 200 begins at step 202 in which repository metadata reader 104 extracts metadata describing a type space model of a computer network from model repository 102. The type space model may describe, for example, entity types that may exist within the computer network and relationship types that may exist between the entity types.

At step 204, entity definition processor 106 processes the extracted metadata to generate user-readable/editable manifest 108 that references the type space model. This step may comprise, for example, serializing the type space model into a user-readable/editable document such as an XML document.

At step 206, a user annotates manifest 108 to add encoded parameters thereto. The user may annotate manifest 108, for example, via a computer-implemented user interface tool. The encoded parameters may include, for example, cardinality information that specifies a particular number of entity type instances or relationship type instances to be generated in creating an instance space model. The encoded parameters may also include, for example, property information that specifies properties to be associated with at least one entity type instance generated in creating the instance space model. For example, property rules may be specified that can be used to determine a property value to be associated with one or more entity type instances. As will be described in Section C, below, this annotation step may also be carried out automatically in certain implementations.

At step 208, type space definition processor 106 receives the annotated version of manifest 108 and processes it to obtain type space model 112 of the computer network. Type space model 112 incorporates the parameters added to manifest 108 during step 206.

At step 210, entity engine 114 creates instance space model 116 of the computer network based on type space model 112 and the parameters incorporated therein. For example, entity engine 114 may generate instance space model 116 by creating 0-n instances of each entity and relationship type included in type space model 112 according to cardinality information incorporated within type space model 112. As another example, entity engine 114 may generate instance space model 116 by associating properties with various entity instances in accordance with property rules incorporated within type space model 112. At step 212, repository write action module 118 stores data representative of instance space model 116 created by entity engine 114 to model repository 102.

A particular implementation of system 100 and flowchart 200 will be now be described in which the type space model of the computer network comprises an object-relational directed graph that describes a plurality of potential directed graph instances and wherein the instance space model of the computer network comprises one of the plurality of potential directed graph instances.

B. Example System Implementation

A particular implementation of system 100 will now be described in which the test data to be generated is test discovery data for a database associated with a version of MICROSOFT SYSTEM CENTER OPERATIONS MANAGER (hereinafter, "SCOM"). In this embodiment, system 100 is configured to create SCOM discovery data that is substantially similar to discovery data that would be generated during the course of a normal SCOM discovery process. As will be described below, such discovery data models an enterprise network as a directed graph. Note that aspects of the implementation of system 100 described in this Section may also be used to generate test discovery data for a database associated with a version of MICROSOFT SYSTEM CENTER SERVICE MANAGER (hereinafter, "SCSM"). Thus, this Section may also include references to SCSM.

It is noted that this embodiment is described by way of example only. Persons skilled in the relevant art(s) will readily appreciate that the concepts described herein may be extended to the generation of test data for other software products and programs, including but not limited to other software products and programs that generate a directed graph instance space using entities and relationships defined by type space metadata.

1. Background and Terminology

To facilitate an understanding of this embodiment, it is helpful to define some terms. The following are brief definitions that associate concepts related to directed graphs with the language of SCOM database modeling techniques.

A SCOM database is designed to provide a concise view of an enterprise network. To achieve this, the database models computers, the relationships between such computers, the software installed on such computers, and the health, performance and state of such computers and software. The model is represented in the form of a directed graph and stored in the SCOM database.

a. Directed Graph Terminology

Figure 3:
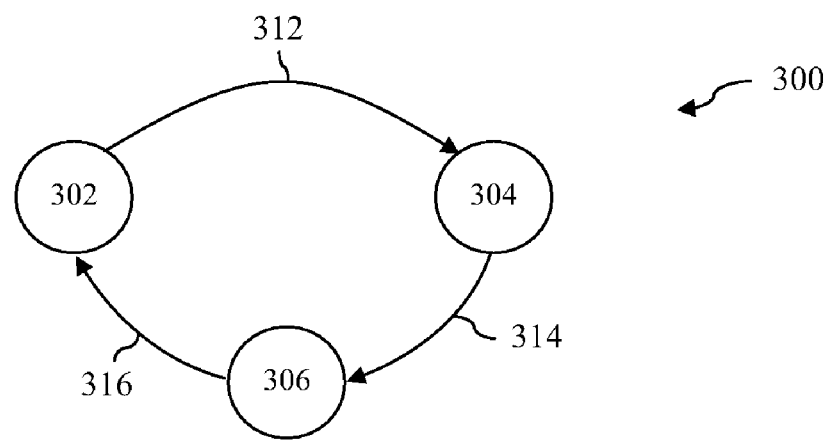
FIG. 3 depicts an example of a directed graph.

Some terms commonly used to describe directed graphs will now be discussed. A directed graph may be defined as a set of nodes and edges in which the edges connect the nodes to each other. Each edge takes the form of an arrow that starts at a node and ends at a node. FIG. 3 depicts an example directed graph 300 having three edges (denoted 312, 314, and 316) that connect three nodes (denoted 302, 304 and 306).

i. Nodes and Edges

Nodes in directed graphs may comprise points, circles, or some other symbol used to represent some state, place, or object. Examples of nodes might be cities on a map. Edges in directed graphs may represent routes between the nodes. For example, the northbound lane of a highway that connects a city A to a city B may be represented as an edge. A southbound lane of that same highway may also be represented as an edge that connects city B to city A.

ii. Cycles and Cyclic Directed Graphs

The terms parent and child may be used to describe the nodes from which an edge starts and ends in some directed graphs. Thus, with continued reference to the foregoing city example involving city A and city B, the northbound edge of the highway has a parent "A" and a child "B". The southbound edge has a parent "B" and a child "A". Some descriptions of directed graphs abbreviate this by simply stating that "A" is a parent of "B" and "B" is a parent of "A". Since either node in this example is a parent of the other, the directed graph is cyclic.

Cycles may be trivial or complex. An edge beginning and ending at the same node is trivial. Cycles that are more complex may include many nodes and edges to trace a route starting at a node and ending at the node. Algorithms that trace directed graphs must account for cycles to avoid infinite loops.

iii. Trees

Figure 4:
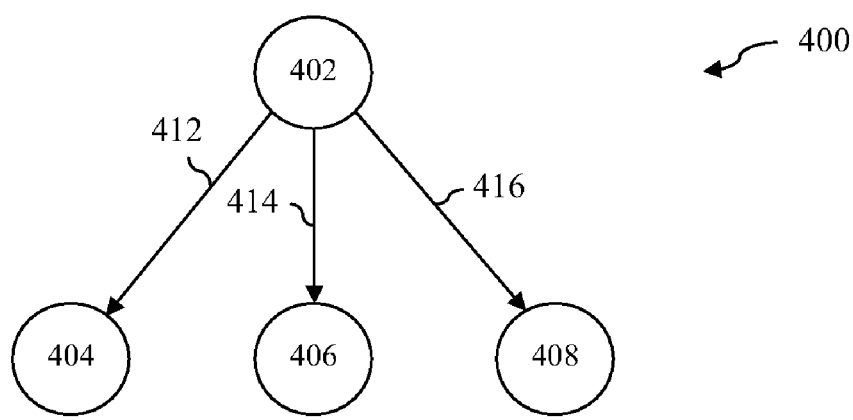
FIG. 4 depicts an example of a tree.

A tree may be defined as a directed graph having the following characteristics: (1) a node may have 0-n edges pointing from it; (2) a node may have 0-1 edges pointing to it; and (3) the directed graph cannot have any cycles. In a tree, the nodes and edges form a parent-child relationship with each other. For example, FIG. 4 depicts a tree 400 having four nodes (denoted 402, 404, 406 and 408) and three edges (denoted 412, 414 and 416). In tree 400, node 402 may be said to be the parent of nodes 404, 406 and 408 since edges 412, 414 and 416 point from node 402 to nodes 404, 406 and 408 respectively.

iv. Non-cyclic Directed Graphs

Figure 5:
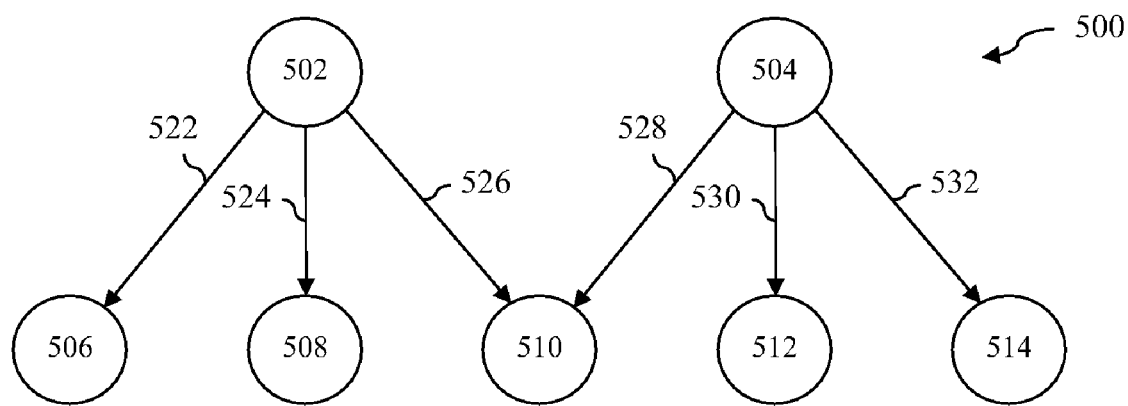
FIG. 5 depicts an example of a non-cyclic directed graph.

A non-cyclic directed graph may be defined as a directed graph having the following characteristics: (1) a node may have 0-n edges pointing from it; (2) a node may have 0-n edges pointing to it; and (3) the directed graph cannot have any cycles. It is noted that the only difference between a non-cyclic directed graph and a tree is that a node may have more than one parent. FIG. 5 depicts an example non-cyclic directed graph 500 having seven nodes (denoted 502, 504, 506, 508, 510, 512 and 514) and six edges (denoted 522, 524, 526, 528, 530 and 532). In non-cyclic directed graph 500, node 502 may be said to be the parent of nodes 506, 508 and 510 since edges 522, 524 and 526 point from node 502 to nodes 506, 508 and 510 respectively. Furthermore, node 504 may be said to be the parent of nodes 510, 512 and 514 since edges 528, 530 and 532 point from node 504 to nodes 510, 512 and 514 respectively.

v. Cyclic Directed Graphs

Figure 6:
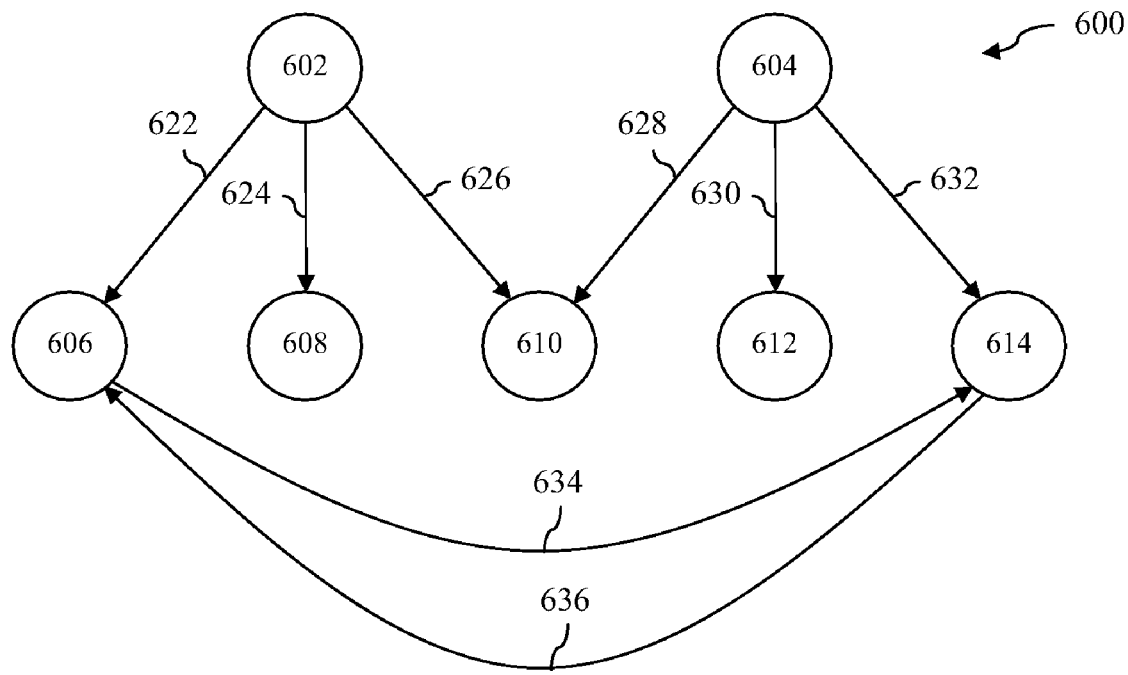
FIG. 6 depicts an example of a cyclic directed graph.

A cyclic directed graph is similar to a non-cyclic directed graph except that the restriction against cycles has been removed. A cyclic graph may be defined as a directed graph having the following characteristics: (1) a node may have 0-n edges pointing from it; (2) a node may have 0-n edges pointing to it; and (3) the directed graph may have cycles. FIG. 6 depicts an example cyclic directed graph 600 having seven nodes (denoted 602, 604, 606, 608, 610, 612 and 614) and eight edges (denoted 622, 624, 626, 628, 630, 632, 634 and 636). In cyclic directed graph 600, node 602 may be said to be the parent of nodes 606, 608 and 610 since edges 622, 624 and 626 point from node 602 to nodes 606, 608 and 610 respectively. Node 604 may be said to be the parent of nodes 610, 612 and 614 since edges 628, 630 and 632 point from node 604 to nodes 610, 612 and 614 respectively.

Furthermore, in cyclic directed graph 600, node 606 may be said to be the parent of node 614 because edge 634 points from node 606 to node 614. Conversely, node 614 may be said to be the parent of node 606 because edge 636 points from node 614 to node 606. The reciprocal parent-child relationship between nodes 606 and 614 forms a cycle.

b. SCOM Terminology

As noted above, a SCOM database models an enterprise network as a directed graph. Nevertheless, the terms used to describe a SCOM database are somewhat different from the directed graph terms set forth above. The following will attempt to explain, in part, the relationship between certain SCOM terms and corresponding directed graph terms.

i. Entities and Entity Types

SCOM uses the term entity to designate a node. An entity may comprise, for example and without limitation, a computer, an instance of a software product or program (e.g., an instance of MICROSOFT SQL SERVER or MICROSOFT INTERNET INFORMATION SERVICES, published by Microsoft Corporation of Redmond, Wash.), a database, a Web site, or a group name. A type may be defined for each entity. For example, a type such as "Windows.Computer," "SQL.Engine," "Database," or the like, may be defined for an entity. Note that in SCSM, an entity may comprise, for example and without limitation, a change request, user comment on an incident, an analyst entry in a change request that completes a change request manual activity, a software update, or the like.

ii. Relationships and Relationship Types

SCOM uses the term relationship to designate an edge that connects entities. The terms source entity and target entity may be used to describe the direction of a relationship. There are three explicit relationship types in SCOM: hosting relationships, containment relationships and reference relationships. Note that in SCSM, an example relationship might be "computer has software update installed."

Hosting relationships define a tree structure. For example, a computer may host 0-n instances of MICROSOFT SQL SERVER, 0-n instances of MICROSOFT INTERNET INFORMATION SERVICES, or the like.

Containment relationships define a potentially non-cyclic directed graph. For example, a group of all instances of MICROSOFT SQL SERVER might include an instance on a computer A, a computer B, and a computer C. Computer C might additionally host an instance of MICROSOFT INTERNET INFORMATION SERVICES so that the group of all MICROSOFT INTERNET INFORMATION SERVICES instances would also include computer C. Since two groups point to computer C, the directed graph is not a tree.

Reference relationships are potentially cyclic. For example, an instance of MICROSOFT EXCHANGE SERVER (published by Microsoft Corporation of Redmond, Wash.) hosted on computer A may refer to an instance of MICROSOFT EXCHANGE SERVER hosted on computer B. In turn, the instance of MICROSOFT EXCHANGE SERVER hosted on computer B may refer to the instance hosted on computer A. This series of relationships is cyclic.

The SCOM database model also includes an implied relationship type that may be termed an inheritance relationship. An inheritance relationship refers to a particular form of hosting in which any entity may (optionally) inherit from another entity. For example, an entity of type "Windows.Computer" may inherit from an entity of type "System.Computer." In addition, another entity of type "Unix.Computer" might also inherit from "System.Computer." If an instance of "Windows.Computer" exists, it inherits from exactly one instance of "System.Computer." In SCOM, inheritance is always single inheritance, which is similar to the single inheritance of classes in the C# programming language.

The metadata used by SCOM to describe an enterprise network does not encode inheritance information as a relationship type. As a result, other methods to be described herein are used for encoding this information.

iii. Entity Lifetime

Hosting relationships in SCOM define existence criteria. For example, if an instance of MICROSOFT SQL SERVER is removed from a computer, then any databases associated with that instance are also removed. As another example, if a user installs an instance of MICROSOFT SQL SERVER on a computer that hosts three MICROSOFT SQL SERVER databases, the SCOM database will recognize the existence of the four new entities. Decommissioning the computer hosting these instances of MICROSOFT SQL SERVER and associated databases is equivalent to making an entire tree disappear. Thus hosting and entity lifetime are tightly linked concepts.

iv. Entity Access

In SCOM, containment relationships are used to define access and security criteria. For example, a SCOM group might be the group of all computers hosting MICROSOFT SQL SERVER and another group might be all computers hosting MICROSOFT INTERNET INFORMATION SERVICES. In accordance with this example, SCOM would define a computer hosting both MICROSOFT SQL SERVER and MICROSOFT INTERNET INFORMATION SERVICES as contained in both groups. Thus, the MICROSOFT SQL SERVER group would point to that computer and the MICROSOFT INTERNET INFORMATION SERVICES group would point to that same computer. Since two groups point to the same computer, the associated "containment" graph is a non-cyclic directed graph.

As noted above, SCOM may use containment graphs to define access criteria. For example, IT operators with access to one group may not have access to another group. So, in a case where a first group and a second group each contain the same computer, an operator having access to only the first group would be able to access the computer included within both groups but not any of the other computers in the second group.

v. Database Entity and Relationship Tables

A SCOM database contains two type-space metadata tables: one that describes entity types and one that defines relationship types between entity types. The database additionally defines two other tables, one that contains entity instances and one that contains entity relationship instances. Each entity and relationship instance contains references to the associated metadata entity or relationship type. Other related tables store property type and instance values for specific entity types and instances within the system.

With only one table containing references to each entity instance and another table containing references to each relationship instance, these two instance-tables define one large cyclic directed graph. However, to facilitate an understanding of the specific implementation of test data generation system 100 described below, it is useful to picture all hosting relationships (including inheritance relationships) as colored red, all containment relationships as blue, and all reference relationships as green. Looking at only the red edges and their connected nodes should reveal a forest of tree structures. Looking at blue edges and their nodes should show a family of non-cyclic graphs. Looking at the blue edges and their nodes should show a family of cyclic graphs.

2. Example Entity Engine Implementation

As discussed above in reference to FIG. 1, entity engine 114 is configured to create an instance space model of a particular enterprise network based on a type space model described by manifest 108 and parameters added thereto by a user. In the SCOM-related implementation currently being described, the instance space model comprises a set of memory instances of objects that form a directed graph. To create the instance space model, entity engine 114 reads and validates annotated manifest 108 and then generates 0-n instances of each SCOM entity and relationship type according to some deterministic algorithm. With a suitably annotated manifest 108, the instance space model generated by entity engine 114 on one computer should be identical to an instance space model generated by entity engine 114 on another computer. However, in one implementation, the annotations made to manifest 108 may also specify non-deterministic instance space models. For example, such annotations may specify entity/relationship cardinality in terms of a random integer function according to the needs of a particular test scenario.

a. Example Algorithm for Generation of Instance Space Model by Entity Engine

Before describing an example of manifest 108, it may be helpful to first describe one manner in which entity engine 114 may operate to process manifest 108. In a SCOM-related implementation, manifest 108 may contain a set of SCOM entity and relationship types that can be used to generate a multitude of different directed graph instances, each of which is a model of a different enterprise network. For example, manifest 108 may contain a copy of the "ManagedType" and "RelationshipType" tables from an SCOM database (i.e., the type space).

In further accordance with such an implementation, a user annotates manifest 108 with information regarding what shape a particular directed graph instance should take, wherein the particular directed graph instance is a model of a particular enterprise network. In an embodiment, the information added by the user to manifest 108 includes cardinality information that specifies a particular number of SCOM entity type instances and relationship type instances to be generated by entity engine 114 and/or property rule information that specifies how to instantiate properties to be associated with various entity instances generated by entity engine 114.

The set of SCOM entity and relationship types may be thought of as a type space model while the particular directed graph instance may be thought of as an instance space model. Entity engine 108 thus operates to create an instance graph from the type space graph.

Figure 7:
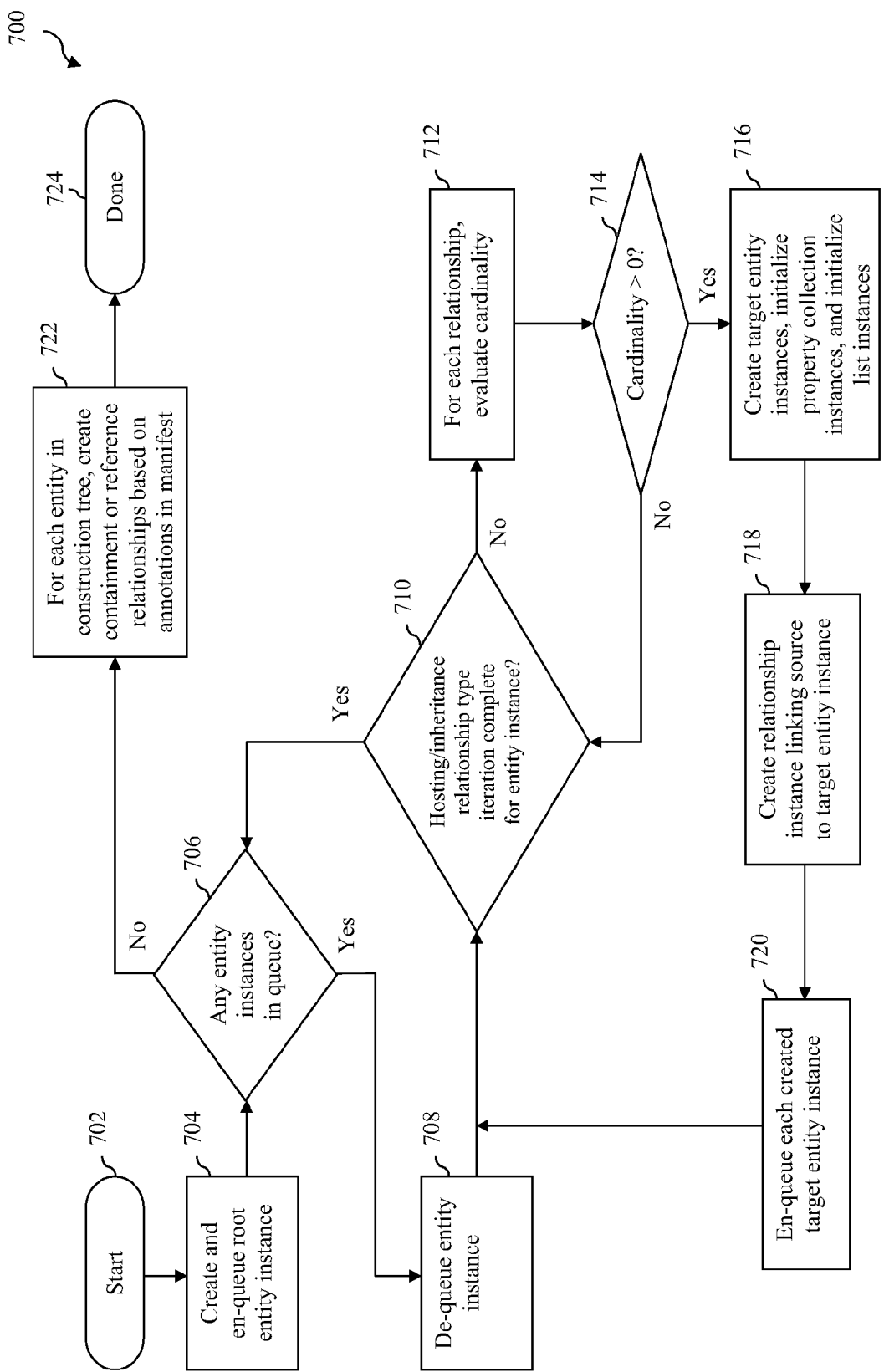
FIG. 7 depicts a flowchart of a method by which an entity engine generates an instance space model of a computer network based on a type space model of the computer network in accordance with an embodiment of the present invention.

FIG. 7 depicts a flowchart 700 of an example method by which entity engine 114 may operate to generate a directed graph instance based on annotated manifest 108. Initiation of the method is represented by block 702 labeled "Start." After the method is initiated, control flows to step 704, in which a root entity instance is created and en-queued in a queue, referred to herein as "EntityQueueCollection."

The root entity instance represents the root node of a tree, referred to herein as a "construction tree," that is generated by entity engine 104 and used as a starting point for iterating through an instance space model. Entity engine 114 generates the root entity instance based on a SCOM "root type" defined in manifest 108. In one embodiment, entity engine 114 identifies the root type in accordance with the following algorithm:

(1) Loop through all SCOM entity types to create a list of all entity types that do not inherit from any other entity;
(2) If the list length is not one, report an error; and
(3) If the list length is one, the listed entity type becomes the "root type."

In SCOM (or SCSM), the root type would be Sytem.Entity.

In SCOM, inheritance means that if an entity inherits from another entity, it is simultaneously the type defined and all types in its inheritance chain. For example, in SCOM, a Windows.Computer inherits from System.Computer. This means that a Windows.Computer instance, if it exists, is also a System.Computer.

All entities in a SCOM database inherit from the System.Entity type. This type is the only entity type that does not inherit from another entity type. Thus, the System.Entity type provides a starting point (root) for iterating through a SCOM instance space model.

After the root entity instance has been created and en-queued, entity engine 114 builds a "construction tree" of entity instances according to relationships in the type space model described by manifest 108. As shown in FIG. 7, the building of the construction tree begins at decision step 706, in which entity engine 114 determines whether there are any entity instances in the queue "EntityQueueCollection." If there are any entity instances in "EntityQueueCollection," then the entity instance at the head of the queue is de-queued as shown at step 708.

At decision step 710, entity engine 114 determines whether it has iterated through all the hosting and inheritance relationship types for the entity instance de-queued during step 708. The various hosting and inheritance relationship types that may apply to a particular entity instance are determined in accordance with the type space model described by manifest 108. If entity engine 114 determines during decision step 710 that it has iterated through all the hosting and inheritance relationship types for the relevant entity instance, then control returns to decision step 706 to determine if there are any more entity instances in "EntityQueueCollection."

If, however, entity engine 114 determines during decision step 710 that it has not iterated through all the hosting and inheritance relationship types for the entity instance de-queued during step 708, it evaluates a cardinality value associated with each remaining hosting or inheritance relationship type as shown at step 714. As discussed above, the cardinality value associated with a hosting or inheritance relationship may be specified, for example, by a user during annotation of manifest 108.

If entity engine 114 determines during decision step 714 that the cardinality value associated with a remaining hosting or inheritance relationship type is not greater than zero, then processing of the relevant hosting or inheritance relationship type for the relevant entity instance is deemed complete and control returns to decision step 710 to determine if there are other remaining hosting or inheritance relationship types through which to iterate for the relevant entity instance.

If, however, entity engine 114 determines during decision step 714 that the cardinality value associated with a remaining hosting or inheritance relationship type is greater than zero, then control flows to step 716, during which entity engine 114 creates 0-n target entity instances based on the cardinality value associated with the particular hosting or inheritance relationship type. During step 716, entity engine 114 also initializes property bag and list instances associated with each created target entity instance. As used herein, the term "property bag" refers to a collection of properties associated with an entity instance. The use of property bag and list instances will be described in more detail herein.

Following step 716, control flows to step 718 during which entity engine 114 creates a relationship instance that links the relevant entity instance (as a source entity) to each target entity instance created during step 716. Following step 718, control flows to step 720, during which entity engine 114 en-queues each target entity instance created during step 716 in queue "EntityQueueCollection." Control then returns to decision step 710, in which it is again determined whether entity engine 114 has iterated through all the hosting/inheritance relationship types for the entity instance previously de-queued during step 708.

After the construction tree has been generated in the manner described above, there will be no more entity instances in "EntityQueueCollection." At this point, control will flow from decision step 706 to step 722. During step 722, entity engine 114 creates containment and/or reference relationships for each entity instance in the construction tree based on parameters added to manifest 108 by a user. In one embodiment, this step involves iterating through the entire construction tree to identify entity instances for which containment and/or reference relationships should be created based on parameters included in manifest 108 and creating such relationships. Other embodiments use plug in modules to shape containment and reference relationships in ways that mimic what the operational software will do or because performance is better with tailored algorithms for some containment and reference relationships.

After step 722 is complete, the method of flowchart 700 is terminated as shown by block 724 labeled "Done." At this point, a complete instance space model has been created. In one embodiment, data representative of the complete instance space model is stored to a SCOM database after termination step 724. In alternate embodiments, data representative of the instance space model is intermittently stored to the SCOM database during or after the completion of one or more processing steps of flowchart 700.

b. Example Entity Engine Implementation Details

The foregoing described an example algorithm that may be implemented by entity engine 114 in a SCOM-related embodiment of system 100. The following describes further implementation details in accordance with such an embodiment. These details are provided by way of example only and are not intended to limit the present invention.

i. Discovery Queue and Instance Space Iteration

Since a SCOM instance space model is potentially a cyclic directed graph, entity engine 114 must have a method of iterating through all of the instances in the directed graph without looping infinitely. To achieve this, in one implementation of entity engine 114, the aforementioned "EntityQueueCollection" queue is configured in such a manner that entity engine 114 visits each entity and relationship instance in the directed graph only once.

In accordance with such an implementation, EntityQueueCollection functions like an ordinary queue in that it en-queues and de-queues entity instances. However, the queue adds a method that ignores an en-queue request if the en-queue request produces a cycle and that processes an en-queue request if the en-queue request does not produce a cycle. In one embodiment, EntityQueueCollection creates an entry in a hash table corresponding to a particular entity instance the first time the entity instance is en-queued. When second and subsequent requests to en-queue the same entity instance are received (as determined by accessing the hash table), EntityQueueCollection ignores them. This approach, which is not necessary for operations on a pure tree, allows every node of an arbitrary directed graph to be visited exactly once.

ii. Inheritance Relationship Type

A SCOM database does not specify inheritance as a true relationship. That is, there is no "inheritance" type in a SCOM "RelationshipType" table. An embodiment of the present invention addresses this issue by requiring manifest 108 to specify inheritance as a relationship of type "Inherit." In such an embodiment, manifest 108 differs from the SCOM database in that it has four rather than three relationship types. In an embodiment, repository metadata reader 104 inserts these relationships into manifest 108 automatically when recognized in the metadata tables of repository 102.

In SCOM, the cardinality of an inheritance relationship is trivial since by definition inheritance cardinality can only have values of zero or one: that is, the relationship exists or it does not. However, including the inheritance relationship allows solving the following dilemma: (1) manifest 108 (and SCOM) specifies an entity type of "Windows.Computer"; (2) "Windows.Server.Computer" inherits from "Windows.Computer"; (3) "Windows.Client.Computer" inherits from "Windows.Computer"; and (4) a computer is either a server (type "Windows.Server.Computer") or a client (type "Windows.Client.Computer") but not both.

By adding two inheritance relationship types to "Windows.Computer," one for "Windows.Server.Computer" and one for "Windows.Client.Computer," it is possible to specify a cardinality of 1 for the computer-to-server relationship and 0 to the computer-to-client relationship, or vice versa.

iii. Relationship Cardinality and Entity Types

As described above, the process by which entity engine 114 generates a construction tree assumes that each relationship type has a defined cardinality. In addition, in one implementation, the process automatically defines the root entity type's cardinality as one. Entity types and the relationship between such types may also be used to determine cardinality for some relationship instances.

In SCOM, the "type" of an entity type is one of the following: Abstract, Singleton, Concrete or Hosted. By Abstract is meant the entity type exists in the metadata but will never exist as an instance in the instance space model. Singleton, Concrete or Hosted entities can exist in the instance space model. The definitions of these types and the relationships between entity types may be used by entity engine 114 to define some types of cardinality according to the following conventions: (1) if an abstract entity has an inheritance relationship to another abstract entity, entity engine 114 defines the cardinality of that relationship as one; (2) if an abstract entity has an inherit relationship to a singleton entity type, entity engine 114 defines the cardinality of that relationship as one with no need to annotate manifest 108; and (3) in all other cases, entity engine 114 defines the cardinality of the relationship as zero unless the user has specified another cardinality value in manifest 108.

The above conventions allow entity engine 114 to generate a construction tree without determining if a cardinality value has been specified in manifest 108 until such time as the engine encounters the first inheritance relationship instance where the target type is concrete and the source type is abstract. At this point, entity engine 114 must use a cardinality value as specified in manifest 108 or assume the cardinality is zero.

iv. Hierarchical Symbol Table

Since each entity instance in a SCOM database may have different property values (e.g., display name, IP address, etc.), it is desirable that entity engine 114 provide a means for easily generating test values for every entity instance created during the method of flowchart 600. To address this issue, an embodiment of the present invention includes a "hierarchical symbol table" by which a user may easily author these values via annotation of manifest 108. One manner of implementing such a hierarchical symbol table will now be described.

a. Name/Value Pairs

The basis for the hierarchical symbol table is the name and value pair. Each symbol has a name and a value. For example, the name might be "DisplayName" and the value "Computer_1" or the name might be "IpAddress" and the value "101.102.103.104". In an embodiment, an entity instance created by entity engine 114 during the method of flowchart 700 will be associated with a list of name/value pairs in the hierarchical symbol table. For example, each entity instance may be associated with several entries in the table, each of which will ultimately be stored in database 102.

b. Symbol Substitution During Property Instantiation

In one embodiment, manifest 108 is an XML document that represents a property rule definition as an element having a name attribute and inner text representing a value. When instantiating an entity, entity engine 114 copies the name and inner text to a property instance associated with the entity instance for each property defined in the entity type definition with one exception.

If the inner text contains the special string "[##symbolReference##]", then entity engine 114 substitutes the value of a previously defined symbol that matches the string between the "[##" and "##]" brackets. By this technique, a user might create the name/value pairs shown below in Table 1.

c. Special Symbols—Id, InstanceNumber and Tag

In an embodiment, entity engine 114 reserves some symbol names for internal use. Three examples are "Id", InstanceNumber, and "Tag". Tag is the value defined in an entity's Tag attribute. The "Id" symbol is the value created for each instance by concatenating the Tag value, an underscore, and an instance number. If an abstract-to-concrete relationship has cardinality of 100, entity engine 114 creates 100 target entity instances and assigns instance numbers 0-99 to each instance. Assuming the Tag of that entity type is "Computer", the Id values for each entity instance will be "Computer_0" through "Computer_99". Using the relationship definitions mentioned above in reference to symbol substitution, this means that the ComputerDomainName values for each entity instance will be "Computer_0.local.test.com" through "Computer_99.local.test.com". Annotators of manifest 108 may reference symbols [##Id##], [##InstanceNumber##], and [##Tag##] in the inner text associated with XML elements to populate property values.

d. Special Reference Modifiers—"Parent"

It may be useful for annotators of manifest 108 to be able to reference property values in parent entities. This capability refers directly to the need for a Windows.Server.Computer instance to have identical values to the instance from which it inherits. Table 2, below, describes instantiation using the Parent reference. In an embodiment, repository metadata reader 104 may be configured to insert [##Parent.propertyName##]

TABLE 1

| Property Name | Inner Text | Value Stored in Property Instance |
| --- | --- | --- |
| DisplayName | [##Id##] | Value stored in instance's property bag for symbol "Id" (assume "Ws_0" for this example) |
| Domain | local.test.com | local.test.com |
| ComputerDomainName | [##Id##].[##Domain##] | Ws_0.local.test.com |

In this example, each entity instance using these three property definitions receives different property values for DisplayName and ComputerDomainName if (and only if) the Id symbol is different in each instance's property bag.

reference values automatically for properties in an entity where the parent entity contains the same property name. This reduces the amount of manifest annotation needed since it is only necessary to define property rules for the parent and the child inheriting entities are already populated correctly.

TABLE 2

| Property Name | Instance Type | Inner XML | Value Stored in Property Instance |
|---|---|---|---|
| Id | Windows.Computer | (special - value is Computer_0) | |
| DisplayName | Windows.Computer | [##Id##] | Ws_0 |
| Domain | Windows.Computer | local.test.com | local.test.com |
| ComputerDomainName | Windows.Computer | [##Id##].[##Domain##] | Ws_0.local.test.com |
| DisplayName | Windows.Server.Computer | [##Parent.DisplayName##] | Ws_0 |
| Domain | Windows.Server.Computer | [##Parent.Domain##] | local.test.com |
| DisplayName | Windows.Server.Computer | [##Parent.DisplayName##] | Ws_0.local.test.com |
| DisplayName | Windows.DC.Server.Computer | [##Parent.DisplayName##] | Ws_0 |
| Domain | Windows.DC.Server.Computer | [##Parent.Domain##] | local.test.com |
| DisplayName | Windows.DC.Server.Computer | [##Parent.DisplayName##] | Ws_0.local.test.com |

Although it appears from Table 2 above that an annotator of manifest 108 may need to edit the property definitions for the Windows.Server.Computer and Windows.DC.Server.Computer, in one implementation, certain methods can read manifest 108, recognize that the entity instance is inheriting, and populate all property inner text by concatenating "[##Parent.", the attribute name, and "##]". Note that Windows.DC.Server.Computer is the entity type for domain controllers—in SCOM (or SCSM), this type inherits from Windows.Server.Computer.

The construction tree defines the hierarchy of the hierarchical symbol table. Since each entity instance is created based on a relationship type with non-zero cardinality, each entity instance except for System.Entity instance has a parent. The Parent reference walks back up the construction tree for each Parent reference encountered. While there is normally no reason to do so, some testers may use "[##Parent.Parent.DisplayName##]" to define the Display name of a Domain controller instance. This value would consume the property value from Windows.Computer rather than Windows.Server.Computer. The only limit on concatenating Parent prefixes is the depth of the construction tree for the instance. In an alternate implementation, a "first parent" modifier may be used such that a symbol locator walks up the tree to the "first parent" with that property name and uses this value. This means that an annotator of manifest 108 does not have to use Parent.Parent.propertyName to skip two levels.

e. Special Reference Modifiers—Tag References

If an entity type has a fixed Tag value specified in manifest 108, symbol substitution may use the Tag value. Thus, if the Windows.Computer type has a fixed Tag value of "Computer", the domain control DisplayName could populate the Windows.Computer.DisplayName using the "[##Tag##][##InstanceNumber##]" rule. In this case, the final name would be Computer.0, Computer.1, etc., rather than Computer_0 when using the [##ID##] rule.

f. Referencing Global Symbols and the Lookup Algorithm

Some values within manifest 108 may produce dramatically different instance space models. For example, a functional tester might use only 10 computers for a functional test. However, a load tester might want to use the same manifest for 50,000 computers. In a suitably designed manifest, this is possible by changing only one value. Similarly, changing a schema associated with manifest 108 to operate on a development machine and then a succession of lab machines may be desired.

For this reason, an embodiment of entity engine 114 reads a list of global symbols from manifest 108 as the first step in creating the hierarchical symbol table. These name/value pairs operate exactly like the property collections for each entity instance. This collection is also the last place that entity engine 114 tries when resolving a symbol reference. Briefly, the hierarchical lookup may proceed as follows:

1. Identify the symbol reference by regular expression processing.
2. Given the reference, split the symbol reference string using ".".
3. If the symbol does not split, do the following:
    If the symbol matches a special name such as Id, Tag, etc., use the appropriate value for substitution.
    If the symbol name exists in the entity instance's property table use that value for substitution.
    If the symbol name exists in the global property table, use that value for substitution.
    If the symbol name lookup false, return a not found error.
4. If the symbol splits, do the following:
    If the left hand string matches "Parent", walk up the construction tree one step and resume recursively at step 2 above using everything to the right of the first "." as the new lookup name.
    If the left hand string matches "FirstParent" walk up the construction tree until either the property is found or not. Either return the found value or return an error.
    Walk up the construction tree until the left hand string matches the tag defined by the left hand side of the string split and resume recursively at step 2 above using everything to the right of the first "." as the new lookup name.
    If neither of the above recursive procedures returns a property value, return a not found error.

g. Symbol Functions

Within SCOM, certain values are virtual repeats of other values. Various reference techniques listed above address many of these "duplicate" value problems allowing easier and more robust annotation of manifest 108. Some of the unaddressed issues are as follows: (1) a computer's NTLM (NT LAN Manager) name normally appears in all upper case although otherwise the same as the computer name; (2) IP addresses, especially on Developer machines must not conflict with Corp net values; and (3) some tests require random values within ranges.

To address these needs, a manifest 108 in accordance with an embodiment of the present invention allows an optional function to be added each symbol definition. If present, entity engine 114 will look up the function by name, use the value specified by manifest 108 (after symbol substitution), run the method associated with the function name, and then return a new string. The returned string becomes the value of the symbol for the entity instance. This technique directly addresses the issues raised above.

Table 3, below, provides examples of some functions that may be provided in accordance with one implementation. These functions have been provided by way of example only. The functions used may reflect the needs of a particular software system. Functions may generally have the following signature: InstantiatedValue=FunctionName(manifestValue), wherein the manifest value is the manifest value after hierarchical symbol lookup.

TABLE 3

| Property Name | Inner XML | Value after Substitution | Function Name | Value Stored in Instance |
|---|---|---|---|---|
| NtlmName | [##Id##] | Server_0 | ToUpper | SERVER_0 |
| IpAddress | 197.*.*.* | 197.*.*.* | ToIpAddress | 197.0.0.1 for the first instance, 197.0.0.2 the second, 197.0.1.1 for the $256^{th}$ instance, etc. |
| IsVirtualMachine | | | RandomBool | True or False |
| Port | 1000, 9999 | 1000, 9999 | RandomInteger | A random number between 1000 and 9999 (inclusive) |
| Description | 1000, 9999 | Astcsyo xtjnxamx ddylcf vlvymswy . . . | RandomWordLike | A random set of character strings between 1000 and 9999 in length |
| DomainOu | [##Domain##] | local.test.com | ToOU | DC = local, DC = test, DC = com |
| PropertyExists | [##BProperty##] | [##BProperty##] | Exists | False (because the symbol BProperty was not found in the hierarchical symbol table) |
| PropertyExists | [##BProperty##] | True | Exists | True (the value of the symbol BProperty) |
| InstallDate | −100 | −100 | DatePlus | Date string for today's date minus 100 days | h. Features Not Addressed by Symbol Processing

The hierarchical symbol table, symbol substitution, function processing, and other concepts discussed above assist in creating realistic SCOM data as is needed for testing. In addition, global symbols allow defining values within manifest 108 making complex edits of long manifests unnecessary.

Another issue to be addressed is providing cardinality information for the client/server inheritance relationship. Table 4 below illustrates a possible function named "?=" that inspects the first two strings in a comma separated list (after symbol substitution). If the first two strings are equal, the function returns the third value. If the values are different, the function returns the fourth value.

TABLE 4

| Property Name | Inner XML | Value after substitution | Function Name | Value stored in instance |
|---|---|---|---|---|
| RelClient | 0, 1 | 0, 1 | RandomInteger | A random integer, either 0 or 1 |
| RelServer | [##RelClient##], 0, 1, 0 | 0, 0, 1, 0 | ?= | 1 |
| RelServer | [##RelClient##], 0, 1, 0 | 1, 0, 1, 0 | ?= | 0 |

Due to the function "?=", RelServer is 1 if RelClient is 0 and vice versa. This is sufficient for providing cardinality information to the client/server inheritance relationship.

v. Lists

In accordance with one embodiment of the invention, "lists" are used to allow annotators of manifest 108 to provide information to entity engine 114 in an intuitive form. Each list has a name, size and type. Furthermore, once initialized, each list consists of an ordered set of "items", wherein each item is in turn a property collection.

a. Weighted Lists

A weighted list is a mechanism by which relatively large lists may be defined using only a relatively small number of list items and associated property definitions. The items of a weighted list define the relative size of that item within the total list size. Thus, a weighted list with three items might represent initialization values for 50,000 computers in a network, 500 computers in a network, or 5 computers in a network. In this case, the only difference is the size attribute of the list.

For example, consider a computer network consisting of 50 servers and 500 clients. The ratio of clients to servers is 10:1. A weighted list represents this information as follows using an "N" value instead of a size for items:

```
<List Tag="ComputerList" Type="WeightedList" Size="500">
    <Item Tag="Server" N="1" NisaWeight="true" >
        <!-- Server property list -->
    </Item>
    <Item Tag="Client" N="10" NisaWeight="true" >
        <!-- Client property list -->
    </Item>
</List>
```

Internally, any list consists of only the information specified in manifest 108. Consequently, there is no memory increase by specifying the same list with a size of 5,000 or 50,000. What changes are the values returned. Table 5, below, shows example distributions derived from this list definition.

TABLE 5

| List Size | Number of Servers | Number of Clients |
|---|---|---|
| 10 | 1 | 9 |
| 550 | 50 | 500 |
| 5000 | 454 | 4546 |
| 50000 | 4545 | 45455 |

Note that in Table 5 the total list size is the sum of the number of servers and clients, but the numbers for clients and servers are not precise when the list size is not a multiple of 11. In all cases, the WeightedList class ensures that the total number of "virtual" items sums to the list size, even when ratios produce real numbers rather than integers.

Examining the XML listed above shows also the attribute NisaWeight with a value of true. Turning the value to false allows interpreting the "N" value as a fixed number rather than a weight. This allows creating a more interesting distribution where no matter the size of the list, there will only be a fixed number of domain controllers. The following XML describes an example:

```
<List Tag="ComputerList" Type="WeightedList"
    N="[##NumberOfComputers##]">
    <Item Tag="Ws" NisaWeight="true" N="500">
        <!-- Workstation property list -->
    </Item>
    <Item Tag="Sql" NisaWeight="true" N="2">
        <!-- Sql Servers property list -->
    </Item>
    <Item Tag="Iis" NisaWeight="true" N="5">
        <!-- IIS Server property list -->
    </Item>
    <Item Tag="Exchange" NisaWeight="true" N="1">
        <!-- Exchange property list -->
    </Item>
    <Item Tag="Dc" NisaWeight="false" N="3">
        <!-- Domain controller property list -->
    </Item>
</List>
```

The above XML models the case where for every five hundred workstations there are two MICROSOFT SQL SERVER (SQL) servers, five MICROSOFT INTERNET INFORMATION SERVICES (IIS) servers, and one MICROSOFT EXCHANGE SERVER (Exchange) server. However, no matter what size the network (note that the size may be dependent on a global symbol value), there will only be three domain controllers. Table 6 below shows various distributions.

TABLE 6

| List Size | Workstations | SQL Servers | IIS Servers | Exchange Servers | Domain Controllers |
|---|---|---|---|---|---|
| 10 | 4 | 1 | 1 | 1 | 3 |
| 50 | 44 | 1 | 1 | 1 | 3 |
| 500 | 489 | 2 | 5 | 1 | 3 |
| 5000 | 4918 | 20 | 49 | 10 | 3 |
| 50000 | 49210 | 172 | 482 | 98 | 3 |

As the above table shows, weighted lists are sensitive to large weight ratios due to the requirements of integer arithmetic. In order to "scale down" lists for functional testing and debugging, the weighted list algorithm may be designed to follow the following conventions: (1) every item in the virtual list will have an actual size of one or more—no item's length will equal zero; (2) if the total number of weighted items plus the total non-weighted item "N" values are greater than the list size, the algorithm reports an error in manifest 108; and (3) after an initial list size calculation, a weighted list adjusts item's sizes to ensure that the sum of all item's virtual size equals the list's specified size.

If annotators of manifest 108 require exact distributions, they may annotate manifest 108 so that the list size minus the non-weighted item lengths is a multiple of the total weights.

b. Simple Lists

Simple lists determine their size from the number of items specified in manifest 108. If manifest 108 specifies 3 items, the list size is 3; if manifest 108 specifies 10 items, the list size is 10.

In the case of simple lists, annotators of manifest 108 should omit the list size attribute and the N and NisaWeight attributes as the weight attributes have no meaning for simple lists and the system internally calculates list size.

c. Device Lists

Device lists are specialized for supplying device codes to disk entities. In one implementation, device list size is between 1 and 24. These lists need not specify items as the list generates the specified number of items, each item having a property name/value pair where the name is "Device" and the value is "c:" through "z:". If an annotator of manifest 108 specifies a device list size of three, successive devices will be "c:", "d:", and "e:". If the list size is 12, the successive devices will be "c:" through "n:".

vi. Relationship Population Using Lists—Hosting and Inheritance

Various list types discussed above provide a simple means of populating relationships. As implied by the sample lists discussed, creating a distribution of various types of computers is a prime example of list usage. This is possible because entity engine 114 "seeds" the target entities of relationships with the property values associated with the virtual position within the list.

a. Relationship Instantiation

The following example expands on the model for creating a variety of computers by introducing the property collections for each item of the list. The weighted list has three items defining workstations, servers, and servers that are also domain controllers.

```
<List Tag="ComputerList" Type="WeightedList" N="101">
    <Item Tag="Ws" NisaWeight="true" N="9">
        <!-- Workstation property list -->
        <Property Name="RelClient">1</Property>
        <Property Name="RelServer">0</Property>
        <Property Name="RelDc">0</Property>
    </Item>
    <Item Tag="Svr" NisaWeight="true" N="1">
        <!-- Server property list -->
        <Property Name="RelClient">0</Property>
        <Property Name="RelServer">1</Property>
        <Property Name="RelDc">0</Property>
    </Item>
    <Item Tag="Dc" NisaWeight="false" N="1">
        <!-- Domain controller property list -->
        <Property Name="RelClient">0</Property>
        <Property Name="RelServer">1</Property>
        <Property Name="RelDc">1</Property>
    </Item>
</List>
```

Recall that Windows.Server.Computer and Windows.Client.Computer inherit from Windows.Computer while Windows.Server.DC.Computer inherits from Windows.Server.Computer. This arrangement requires three cardinality values, one for client relationships, one for server relationships, and one for domain controller relationships.

When entity engine 114 encounters the abstract System.Computer entity definition, that definition contains the above list and a relationship to Windows.Computer that in turn specifies PopulateUsingList="ComputerList". Entity engine 114 uses this information to create 101 Windows.Computer entities (the list size). However, before instantiating the property values of each of the Windows.Computer entities using the Windows.Computer property definitions, entity engine 114 populates each of the 101 property bags with the list properties. Thus the first 90 Windows.Computer property bags contain values where RelClient=1, RelServer=0, and RelDc=0. The next 10 contain RelClient=0, RelServer=1, and RelDc=0. The last entity contains RelClient=0, RelServer=1, and RelDc=1.

Within the Windows.Computer entity definition, there are many relationships. These include the relationships to Windows.Client.Computer and Windows.Server.Computer. The relationship to Windows.Client.Computer specifies SelectionSize="RelClient" and Windows.Server.Computer specifies SelectionSize="RelServer". Since the property bags contain values for these before relationship instantiation (due to the list populate functionality), these relationships have a cardinality of 1 or 0 depending on the list property bag values. Thus, entity engine 114 creates Windows.Client.Computer inherited entities for the first 90 Windows.Computer entities and Windows.Server.Computer inherited entities for the next 11 entities.

After instantiating the Windows.Server.Computer entities, entity engine 114 sees the inherited relationship to Windows.Server.DC.Computer with SelectionSize="[##FirstParent.RelDc##]". Since the Windows.Server.DC.Computer is a child of Windows.Server.Computer in the construction tree, the symbol processor goes to the parent entity and uses the RelDc value from the hierarchical symbol table. Thus only the last of the 11 servers also inherit from Windows.Server.DC.Computer.

The result of the above population is creation of 203 entities in the memory space of entity engine 114: 101 Windows.Computers, 90 Windows.Client.Computers, 11 Windows.Server.Computers, and 1 Windows.Server.DC.Computers. All Windows.Computers contain inheritance relationships to the appropriate client or server computer entities and the last server also has an inherited relationship to the domain controller entity.

b. Populating Tag Values

List population may also allow populating the Tag values of child entities. For example, in one implementation, if the list items contain a property name/value pair where the name is Tag, entity engine 114 creates the child entities with the corresponding Tag value as the following XML fragment shows.

```
<List Tag="ComputerList" Type="WeightedList" N="101">
    <Item Tag="Ws" NisaWeight="true" N="9">
        <!-- Workstation property list -->
        <Property Name="Tag">Ws</Property>
        <Property Name="RelClient">1</Property>
        <Property Name="RelServer">0</Property>
        <Property Name="RelDc">0</Property>
    </Item>
    <Item Tag="Svr" NisaWeight="true" N="1">
        <!-- Server property list -->
        <Property Name="Tag">Svr</Property>
        <Property Name="RelClient">0</Property>
        <Property Name="RelServer">1</Property>
        <Property Name="RelDc">0</Property>
    </Item>
    <Item Tag="Dc" NisaWeight="false" N="1">
        <!-- Domain controller property list -->
        <Property Name="Tag">Dc</Property>
        <Property Name="RelClient">0</Property>
        <Property Name="RelServer">1</Property>
        <Property Name="RelDc">1</Property>
    </Item>
</List>
```

When using the above list in populating the relationship to Windows.Computer, each Windows.Client.Computer instantiates with a Tag value of "Ws". This value overrides any EntityType Tag value specified by the manifest for Windows.Client.Computer. Thus, Windows.Client.Computer instances have Id values of Ws_0 through Ws-89. Windows.Server.Computers that are not domain controllers have Ids of Svr_90 through Svr_99. The domain controller has an Id of Dc_100. Allowing the population functionality to specify Tag values allows better identification of entity instances during debugging and log perusal when using the final test bed. It also allows creating display values for entities that are easier to identify when inspecting SCOM's or SCSM's display view.

c. Populating Relationships Using Simple and Device Lists

Sometimes, annotators of manifest 108 may need only a few entity instances to populate a list. Two examples are populating databases within an SQL engine and specifying a few disks for a computer.

For the SQL database case, the following simple list provides realistic data for populating the relationship between a SQL engine and its corresponding databases.

```
<List Tag="SqlDbList" Type="SimpleList">
    <Item Tag="Master">
        <Property Name="DbName">Master</Property>
        <Property Name="DbSize">4.0</Property>
        <Property Name="LogSize">1.0</Property>
    </Item>
    <Item Tag="Model">
        <Property Name="DbName">Model</Property>
        <Property Name="DbSize">1.0</Property>
        <Property Name="LogSize">0.5</Property>
    </Item>
    <Item Tag="msdb">
        <Property Name="DbName">msdb</Property>
        <Property Name="DbSize">5.0</Property>
        <Property Name="LogSize">1.0</Property>
    </Item>
    <Item Tag="temp">
        <Property Name="DbName">temp</Property>
        <Property Name="DbSize">8.0</Property>
        <Property Name="LogSize">1.0</Property>
    </Item>
    <Item Tag="d1">
        <Property Name="DbName">Dev1</Property>
        <Property Name="DbSize">20.0</Property>
        <Property Name="LogSize">10.0</Property>
    </Item>
    <Item Tag="d2">
        <Property Name="DbName">Dev2</Property>
        <Property Name="DbSize">100.0</Property>
        <Property Name="LogSize">50.0</Property>
    </Item>
</List>
```

In the case of a computer hosting logical devices, the following XML fragments provide a possible implementation.

```
<PropertyTypes>
    <PropertyType Name="DiskListSize"
        FunctionName="RandomInteger">1,3</PropertyType>
</PropertyTypes>
<Lists>
    <List Tag="DiskList" Type="DeviceList" N="[##DiskListSize##]" />
</Lists>
```

The above device has 1-3 items as specified by the DiskListSize property. Since each instance of the entity defined with this XML will create a different value, some computers will have 1 disk, some will have 2 and some 3 disks.

vii. Relationship Population Using Lists—Containment and Reference

As discussed above, entity engine 114 populates containment and reference relationships after completing the construction tree. At this point the instance space is complete, except for containment and reference relationships. Populating these relationships requires identifying existing target entity instances and creating new relationship instances between sources and targets.

Containment and reference relationships may be populated using simple lists. These lists identify the normal properties of a simple list item used to identify targets of a containment or reference relationship. The algorithm used to find targets may be denoted "SearchMethod" and may find targets based on any of the following:

ScopeRegex—This is a regular expression for matching entity instance Ids satisfying the scope criteria.

ScopeTypes—This is a comma separated list of entity types satisfying the scope criteria.

IncludeIds—This is a comma separated list of entity Ids for matching entity instance Ids within the scope of the search for inclusion in populating the relationship.

IncludeTypes—This is a comma separated list of entity types that identify the types (within scope) to include in populating the relationship.

ExcludeIds—This is a comma separated list of entity Ids used to prune the list of entities identified by the inclusion criteria. If there is an Id match, the engine prunes that entity from the effective list of entities used to populate the relationship.

ExcludeTypes—This is a comma separated list of entity property types. The engine prunes an entity whose type equals any type in this list.

PlugIn—This optional parameter specifies that a function in an optional plug-in module is required to determine end points.

All the above property name/value pairs are optional. If the SearchMethod property exists, the search method author is free to use any or none of the other name/value pairs. If the SearchMethod is absent, the search proceeds using the default search method described by the above parameters. The default search does not identify any instances if there is no scope or no inclusion criteria. The following example list allows a SystemCenter.HealthService to identify the Windows.Computer that hosts it. Since Windows.Computer instances host a SystemCenter.HealthService instance via a relationship with SelectionSize="1", entity engine 114 creates one health service entity for each computer entity and a hosting relationship between them. The reference relationship must point back to one Windows.Computer instance from among all the instances in the build tree appropriate for creating this reference relationship. This example models a health service monitoring the computer on which it is installed.

```
<EntityType Name="Microsoft.SystemCenter.HealthService" >
    <List Tag="HostComputer" Type="SimpleList">
        <Item>
            <Property Name=
            "ScopeType">Microsoft.Windows.Computer</Property>
            <Property Name=
            "IncludeType">Microsoft.Windows.Computer</Property>
        </Item>
    </List>
    <RelationshipTypes>
        <RelationshipType Type="Reference"
        TargetTypeName="System.Entity"
            PopulateUsingList="HostComputer" />
    </RelationshipTypes>
</EntityType>
```

The above XML specifies a valid target for the reference relationship. The search algorithm recursively ascends up the construction tree. At each step, it matches the entity found against the Scope criteria. Since Windows.Computer hosts the Health.Service, this is only one step. Once identified, the scope instance has identified a subset of the construction tree wherein the desired entity exists. In this case, the scope and inclusion criteria identify the root instance within scope.

Since this scope contains no Windows.Computers elsewhere in scope, there is only one target instance.

Note that the selection criteria use SelectionSize to limit the actual number of potential relationships identified by the search function.

viii. Example Entity Engine Code

In an embodiment, entity engine 114 is implemented as a dynamic link library (DLL) that contains object definitions and methods necessary to read a serialized XML structure representative of manifest 108 and to create an instantiated memory module from it. The primary objects defined within this module may be defined as follows:

EntityEngine—This class contains the methods necessary to convert XML definitions to an instance space consisting of Entity and Relationship objects. It exposes several methods and properties including the following:

Load and LoadFile—these methods trigger the Entity Definition Module to prepare a type space by Deserializing the manifest. The result is a memory type space.

Initialize—This method creates the instance space in memory instances according to the memory type space (de-serialized manifest).

Discover—This method iterates through the construction tree reporting EntityDiscovered and RelationshipDiscovered events as it proceeds through the construction tree.

EntityDiscovered event—This event fires whenever the Discover method encounters a concrete or hosted entity.

RelationshipDiscovered event—This event fires whenever the Discover method encounters a Hosted, Containment or Reference relationship.

Entity—the class that defines an entity instance. It exposes several properties, which include the following:

XmlEntity—This is a pointer to the entity type definition within the de-serialized XML manifest.

Properties—This is the property collection (also called the property bag) containing name/value pair instances created according to the XML specifications.

Lists—This is the collection of lists containing the lists created according to the XML specifications.

RelationPointingToAnother—This collection contains all relationships that point to a target entity instances.

RelationsPointingToThis—This collection contains references to all relationships pointing from another entity instance to this entity instance.

UserObject—see description below.

An entity instance also exposes other C# properties including Id, Tag, Guid, engine reference, etc.

Property—This class defines a property instance within a property collection. Each instance exposes Name, Guid, IsKey, and Value as C# properties.

Relationship—This class defines a relationship. Its primary C# properties include source entity, target entity, Guid, UserObject, and its property collection.

In an embodiment, the objects within the Entity engine are easy to create and use in a wide variety of testing environments. The following describes simple code samples that may be used for getting started in most testing environments.

a. Creating a Memory Instance Space

The following code shows how developers can create a memory instance space within their unique testing environments from an XML manifest file "sample.xml". The "To do" comment denotes the location where a tester would place code to use the instance space.

```
public void SampleInstantiation( ) {
    EntityEngine engine = new EntityEngine( );
    engine.EntityEvent +=
        new EventHandler<EntityEventArgs>(this.EntityEventHandler);
    if (!engine.LoadFile("sample.xml")) {
        throw new EntityException(Resources.LoadFailed);
    }
    if (!engine.Initialize( )) {
        throw new EntityException(Resources.InitializationFailed);
    }
    // Todo: Use entity instances
}
private void EntityEventHandler(object sender, EntityEventArgs e) {
    if (e.EventType == EntityEventType.Exception) {
        Console.WriteLine(e.EventType + " " +
            e.EntityObject.ToString( ) + " " + e.Message +
            " " + e.Exception.ToString( ));
        return;
    }
    Console.WriteLine(e.EventType + " " + e.EntityObject.ToString( ) +
        " " + e.Message);
}
``` b. Iterating Through the Memory Instance Space

The next code sample demonstrates iteration through the construction tree using the Engine's Discover method. The "to do" comment denotes the code location where the tester would create the memory instance space.

```
public void SampleDiscovery( ) {
    EntityEngine engine = new EntityEngine( );
    // Todo: Initialize engine here
    engine.EntityDiscovered += new
        EventHandler<EntityDiscoveredEventArgs>(this.EntityHandler);
    engine.RelationshipDiscovered +=new
        EventHandler<RelationshipDiscoveredEventArgs>(
            this.RelationshipHandler);
    if (!engine.Discover(true, true)) {
        throw new EntityException(Resources.DiscoveryFailed);
    }
}
private void EntityHandler(object sender,
    EntityDiscoveredEventArgs e) {
    Console.WriteLine(e.DiscoveredEntity.ToString( ));
}
private void RelationshipHandler(object sender,
    RelationshipDiscoveredEventArgs e) {
    Console.WriteLine(e.DiscoveredRelationship.RelationshipType +
        " " +
        e.DiscoveredRelationship.FromEntity.ToString( ) + " " +
        e.DiscoveredRelationship.ToEntity.ToString( ));
}
``` c. Attaching Objects to Entity and Relationship Objects

Since the engine processing makes it impossible to inherit the Entity or Relationship objects to include arbitrary test data, both objects use object containment to allow test developers to attach classes to these objects within the instance space. The Relationship and Entity classes each contain the following implementation for the UserObject field:

```
public IUserObject UserObject
{
    get { return this.userObject; }
    set {
        if (value != null) {
            this.userObject.InstanceObject = this;
        }
```

```
    this.userObject = value;
  }
}
```

IUserObject has the following definition.

```
public interface IUserObject
{
  object InstanceObject
  {
    get;
    set;
  }
}
```

The following code illustrates hooking up MyEntityObject to the Entity objects via object containment. Similar methods are possible for Relationship objects. Note that when the user sets the UserObject within the Entity or Relationship, the Entity set method automatically populates MyEntityObject's InstanceObject. Therefore, the HostEntity property of MyEntityObject will contain a non-null Entity reference whenever the new MyEntityObject instance initializes the Entity's UserObject property.

```
public void AddUserObjects( ) {
  EntityEngine engine = new EntityEngine( );
  // Initialize engine here
  engine.EntityDiscovered += new
      EventHandler<EntityDiscoveredEventArgs>(this.AddObject);
  engine.Discover(true, false);
  engine.EntityDiscovered -= new
      EventHandler<EntityDiscoveredEventArgs>(this.AddObject);
  // Continue processing here
}
private void AddObject(object sender, EntityDiscoveredEventArgs e)
{
  e.DiscoveredEntity.UserObject = new MyEntityObject( );
}
private class MyEntityObject : IUserObject
{
  // required by IUserObject interface
  public object InstanceObject { get; set; }
  // tailored for use only within Entity objects
  public Entity HostEntity { get { return this.InstanceObject as Entity; } }
  // other class properties and methods
}
```

3. Example Manifest Implementation

Manifest 108 defines the input format to entity engine 114, which creates all the desired entity and relationship instances using the engine concepts discussed previously. This section describes approaches for creating a well-formed manifest 108 in a SCOM-related embodiment in which manifest 108 comprises an XML document.

In accordance with this embodiment, the XML manifest defines three main elements of the document's root element. Entity engine 114 processes these three sections in the order given regardless of the order within the XML. These sections are as follows:

Global Properties—a set of property definitions that apply to the entire application such as database connection string, debug flags, etc.

Entity Type definitions—a set of elements that describe the entity types, properties, lists, and relationships the engine should instantiate.

Discovery rules—a list of discovery rule guids (globally unique identifiers) such as the SCOM discovery process would use when reporting data to a root management server (RMS).

The above three main sections are sufficient for entity engine 114 to begin processing. The following is a skeleton XML sample showing the main elements of the root element (named "Xml").

```
<?xml version="1.0" encoding="utf-8"?>
<Xml xmlns:xsi="http://www.w3.org/2001/XMLSchema-instance"
    xmlns:xsd="http://www.w3.org/2001/XMLSchema">
  <Properties>
    <!-- define global properties here -->
  </Properties>
  <EntityTypes>
    <!-- Define Entity types here -->
  </EntityTypes>
  <DiscoveryRules>
    <!-- Define discovery rules here-->
  </DiscoveryRules>
</Xml>
```

The following describe the Properties, Entity Types, and Discovery Rules elements in detail.

a. Global Properties

The global properties form a collection of name and value definitions. Entity engine 114 instantiates them in the order specified. These name/value pairs form the basis of the hierarchical symbol table. Each global property has the following attributes and internal text:

<Property Name="nnnn" FunctionName="ffff">vvvv</Property>

As shown, each global property definition has a name (in this case nnnn), an optional Function Name (ffff) and an optional internal text (vvvv). Annotators of manifest 108 may use symbol substation in either the function name or inner XML. Since global symbols evaluate in order, such annotators must define a symbol before using it by ordering global property definitions.

```
<Property Name="ConnectionString">Data Source=localhost;
  Initial Catalog=OperationsManager; Integrated
  Security=True</Property>
<Property Name="NumberOfComputers">150</Property>
<Property Name="DiscoveryType">AddUpdate</Property>
``` b. Entity Types

The following XML provides a skeleton of an entity type definition that may be used for SCOM data. While entity engine 114 does not know about SCOM, the XML serialization and de-serialization process requires some attributes and values in order to property communicate with the SCOM database.

Each entity definition element defines three sub-elements: property types, lists, and relationships. Since entity engine 114 uses the XML in this order, annotators of manifest 108 should observe the same order for maximum readability. The following defines the Entity XML skeleton. Each element is optional meaning that if an entity definition has no lists, the Lists element need not appear, etc.

```xml
<EntityType Tag="gggg" Name="nnnn" Guid="aaaaaaaa-bbbb-cccc-
        dddd-eeeeeeeeeeee" Type="tttt" InheritFrom="tttt"
        HostedBy="tttt">
    <PropertyTypes>
        <!-- Property type collection -->
    </PropertyTypes>
    <Lists>
        <!-- List collection -->
    </Lists>
    <RelationshipTypes>
        <!-- Relationship collection -->
    </RelationshipTypes>
</EntityType>
```

Each entity element has attributes as follows:

Tag—an optional attribute used to create an Id value. If an entity's tag is "Ws" and the system needs to generate 50 instances of that entity type, the Id instance values will be Ws_0, Ws_1 ... Ws_49. If there is no tag, the system generates a unique tag using the required name attribute or receives a tag value via PopulateUsingList.

Name—The name attribute is required. It defines the target name for all relationships, HostedBy, and InheritFrom attribute values elsewhere in the XML. The name cannot contain a symbol reference.

Guid—This attribute is required. This guid is the reference to the row in the base managed entity table that corresponds to this entity definition.

Type—This attribute is required. It defines the type of entity and contains values derived from the IsAbstract, IsSingleton, and IsHosted Boolean values in the base managed entity table. Entities may be abstract, concrete, or hosted.

InheritFrom—This optional attribute defines the type from which this entity inherits. Entity engine 114 allows only one entity definition without any InheritFrom entity—the root entity (System.Entity).

HostedBy—This optional attribute defines another entity type that hosts this entity.

InheritFrom and HostedBy attributes contain redundant data in that relationships in other XML elements contain the same information. Normally an XML pre-processor populates these attributes (from the relationships) so that annotators of manifest 108 need not edit them.

i. Property Type Definitions

An entity's property definitions are a collection of name and value definitions similar to those of the global properties. The following XML provides samples of a property definition.

```xml
<PropertyType Name="nnnn" FunctionName="ffff" Guid="aaaaaaaa-
bbbb-cccc-dddd-eeeeeeeeeeee" PrimaryKey="boolValue"
>vvvv</PropertyType>
```

The property name is the only required attribute. It must be unique within an entities collection. However, the name need not be unique across all entity definitions within the XML, only within an entity's property collection (i.e., both an Incident and a ChangeRequest entity may have a CreatedDate property). The following outlines other attribute conventions:

The Guid attribute, if present, identifies the property as one a value stored in the SCOM database for the entity instance. Property types containing Guid attributes must correspond to property types defined in the SCOM database.

Since the SCOM database uses guids to identify values in the database, the property name need not correspond to the name in the database.

If a Guid attribute is absent, the name/value pair is (by definition) a variable. There is no limit on the number of variables in a property type collection.

The PrimaryKey attribute, if present, identifies a SCOM data value that identifies a primary key for identifying the entity instance within the SCOM database. A preprocessor normally populates this attribute if required by the database.

All property type definitions cause values to appear in the hierarchical symbol table. In addition, PopulateUsingList relationships may pre-populate the collection with additional variables. Annotators of manifest 108 should create list property names to avoid collisions with the names defined within the entity's property type definitions.

ii. Entity List Definitions

Entity lists define sets of items and property collections as discussed previously. Each list contains a list of items. Items in turn contain a list of property values. The syntax is as follows:

```xml
<List Tag="nnnn" Type="tttt" Size="ssss">
    <Item NisaWeight="boolValue" N="sss">
        <Property Name="nn1" FunctionName="ffff" >vv</Property>
        <Property Name="nn2" FunctionName="ffff" >vv</Property>
    </Item>
    <Item NisaWeight="boolValue" N="sss">
        <Property Name="nn1" FunctionName="ffff" >vv</Property>
        <Property Name="nn2" FunctionName="ffff" >vv</Property>
    </Item>
    <Item NisaWeight="boolValue" N="sss">
        <Property Name="nn1" FunctionName="ffff" >vv</Property>
        <Property Name="nn2" FunctionName="ffff" >vv</Property>
    </Item>
    <Item NisaWeight="boolValue" N="sss">
        <Property Name="nn1" FunctionName="ffff" >vv</Property>
        <Property Name="nn2" FunctionName="ffff" >vv</Property>
    </Item>
    <Item NisaWeight="boolValue" N="sss">
        <Property Name="nn1" FunctionName="ffff" >vv</Property>
        <Property Name="nn2" FunctionName="ffff" >vv</Property>
    </Item>
</List>
```

In one embodiment, the attributes of lists, items, and property elements must observe the following rules:

The List and Item tags are required. List tags must be unique within lists for an entity. Item tags must be unique within their corresponding list.

The list Type attribute must correspond to a list type supported by the entity engine.

List size is optional except for weighted lists. It may contain symbol references to values found in the hierarchical symbol table.

NisaWeight and N attributes in weighted lists are required but are ignored (if present) in other list types.

Property names must be unique within an Item. Normally, these property names provide cardinality, scope or target data to populate relationships. Therefore, it is common for each item to have identical property names, each with different values.

Function names and inner XML values evaluate using symbol substitution in the context of the entity being instantiated. Either may contain symbol references.

iii. Relationship Type Definitions

Each entity contains a list of relationships. Relationships have the following XML:

```
<RelationshipType Tag="xxx"
    Name="yyy"
    Type="ttt"
    Guid="aaaaaaaa-bbbb-cccc-dddd-eeeeeeeeeeee"
    TargetTypeName="zzz"
    SelectionSizeFunction="ffff" SelectionSize="nnn"
    PopulateUsingList="DiskList" >
        <Property Name="nnnn"
            Guid="aaaaaaaa-bbbb-cccc-dddd-eeeeeeeeeeee">vvvv</Property>
</RelationshipType>
```

In an embodiment, the relationship XML must conform to the following conventions:

The tag attribute is optional. Normally a preprocessor populates this attribute. However, annotators of manifest 108 may find it convenient to provide a unique tag value when debugging XML manifests.

The name attribute is required but is primarily for XML readability. If the tag attribute is missing, the engine will use the name attribute or a substring of it as the tag value for each relationship instance.

Relationship type must be one of the following values: Inherited, Hosting, Containment, or Reference. Inclusion of Inherited relationships provides a means for introducing cardinality for abstract-to-concrete relationships but these relationships do not propagate to a SCOM database's Relationship tables. Storing an inherited entity with parent key values is sufficient to store an inherited type.

The Guid attribute is required since it identifies the relationship within the SCOM database.

The TargetTypeName attribute is required. It identifies the target of the relationship and thus there must exist some entity definition elsewhere in the XML with a name equal to the target name or an error occurs.

SelectionSizeFunction and SelectionSize attributes function like property functions and inner XML values to produce relationship cardinality. The result after string substitution must be a valid integer value. Integer values greater than zero govern relationship instantiation.

The PopulateUsingList attribute must identify a valid list if present. List references may use the Parent or Tag prefixes to identify a list not in the current entity.

When examining engine objects, developers will find that each relationship has a unique Id value similar to that produced for Entity instances. In the absence of a Tag attribute, the engine creates a tag value using a unique substring of the relationship name. The Id value in turn is tag concatenated with underscore concatenated with the instance number. The number ranges from zero to N where N is less than the relationship cardinality.

Note that relationships in SCOM (or SCSM) can contain properties or variables. For example, the SCSM reference relationship assigning a software update to a computer has a property value called "InstallationFailed" with a value of true or false. In an embodiment, repository metadata reader 104 associates the proper Guid with the name and value. Manifest annotators will add the true or false value (or perhaps a FunctionName="RandomBool"). If the name value pair has no Guid, entity engine 114 treats the name/value as a variable and will not persist the value to model repository 102. The following is a sample of a variable in the relationship property collection.

```
<Property Name="DiscoveryRuleGuid">6e377e05-ddb2-daea-966b-
    b3726cd27230</Property>
```

The above example shows a relationship variable (no Guid attribute—however the value of the variable turns out in this case to be a GUID value) so write action module 118 will not attempt to write this relationship property to repository 102. However, the name value pair is available to write action module 118 when processing the relationship. In an embodiment, write action module 118 looks for the special "DiscoveryRuleGuid" variable and uses it as a required parameter in relationship database API calls. While this value does not persist to repository 102 as a property, a manifest annotator can provide values to an API of write action module 118 on an as-needed basis. Property variables such as this illustrate how a manifest annotator may communicate values to write action module 118 even though write action module 118 only has direct access to instance space 116.

Properties such as the above provide data to the discovery data processor methods. Currently, the logic to match entities and relationship to rule Guids is very primitive. The above allows the XML author to specify the precise Guid to use for calling a relationship store API. Presumably the guid value chosen is what an agent's discovery method would use.

c. Discovery Rules

The following XML shows samples of DiscoveryRule XML. Note that discovery rule is an optional XML element used for SCOM that is not present in SCSM manifests.

```
<Rule Name="Microsoft.SystemCenter.DiscoverWindowsProductType"
    RuleId="0bdb501b-8079-84ee-c1f8-563d0fecc1de"
    SourceName="Microsoft.Windows.Computer"
    TargetName="Microsoft.Windows.OperatingSystem" />
<Rule Name="Microsoft.SystemCenter.NetworkDevice.PopulateGroup"
    RuleId="e1e5bd6e-0503-c707-c3d5-247815977ce9"
    SourceName="Microsoft.SystemCenter.NetworkDeviceGroup"
    SourceTypeName="Microsoft.SystemCenter.NetworkDeviceGroup"
    TargetTypeName="Microsoft.SystemCenter.NetworkDevice"
    RelationshipTypeName=
        "Microsoft.SystemCenter.-
        NetworkDeviceGroupContainsNetworkDevice"
    RelationshipTypeId="149931d0-e600-ff47-ea1e-d809eee56ab1" />
```

A SCOM repository metadata reader extract these from the SCOM rule table (a part of the SCOM repository metadata) and places them in the XML.

4. Example Entity Definition Processor Implementation

In an embodiment that will now be described, entity definition processor 106 is implemented as a DLL and is configured to serialize, de-serialize and merge an XML document that comprises manifest 108. In accordance with this embodiment, entity definition processor 106 contains several public methods including the following two:

```
public static Xml Deserialize(string xml, EntityEvent entityEvent)
public string Serialize(EntityEvent entityEvent)
```

The Deserialize method is configured to accept the manifest XML as a string (xml) and return an XML object. The serialize method is configured to serialize the XML object and return the XML manifest as a string. Users can capture any XML errors and other information events in either method using the entityevent delegate.

As used above, the term "merge" refers to a process whereby user annotations from one manifest are merged into another manifest. This typically allows merging the hand annotations of an older version manifest into a manifest generated by repository metadata reader 104 on a newer version model repository to produce a new manifest that can operate in the newer version type space. This is also the mechanism by which archetype manifests (which will be described in more detail herein) are merged into next generations of the product manifests to generate future test beds.

Briefly, the goal of the merge process is to transfer as much of the annotations from an old manifest into a blank manifest generated by repository metadata reader 104. Since in one embodiment the merged manifest and the old manifest are both XML files, a file difference viewer allows the developer to assess any additional annotations needed to "turn on" features that were not implemented in the old manifest.

The XML class derives from an EntitySchema.xsd file. As such, the various XML elements appear as arrays of global properties, entity definitions and discovery rules. These in turn contain arrays of classes for each element defined in the xsd. Arrays are cumbersome for add/remove operations. Therefore, the XML class contains methods to convert all of the arrays to collections and all collections back to arrays (prior to serialization). In further accordance with this embodiment, entity definition processor 106 includes collections of classes defined by the Xsd and methods necessary to convert between arrays and collections.

C. Preparation and Refinement of Manifests

Figure 8:
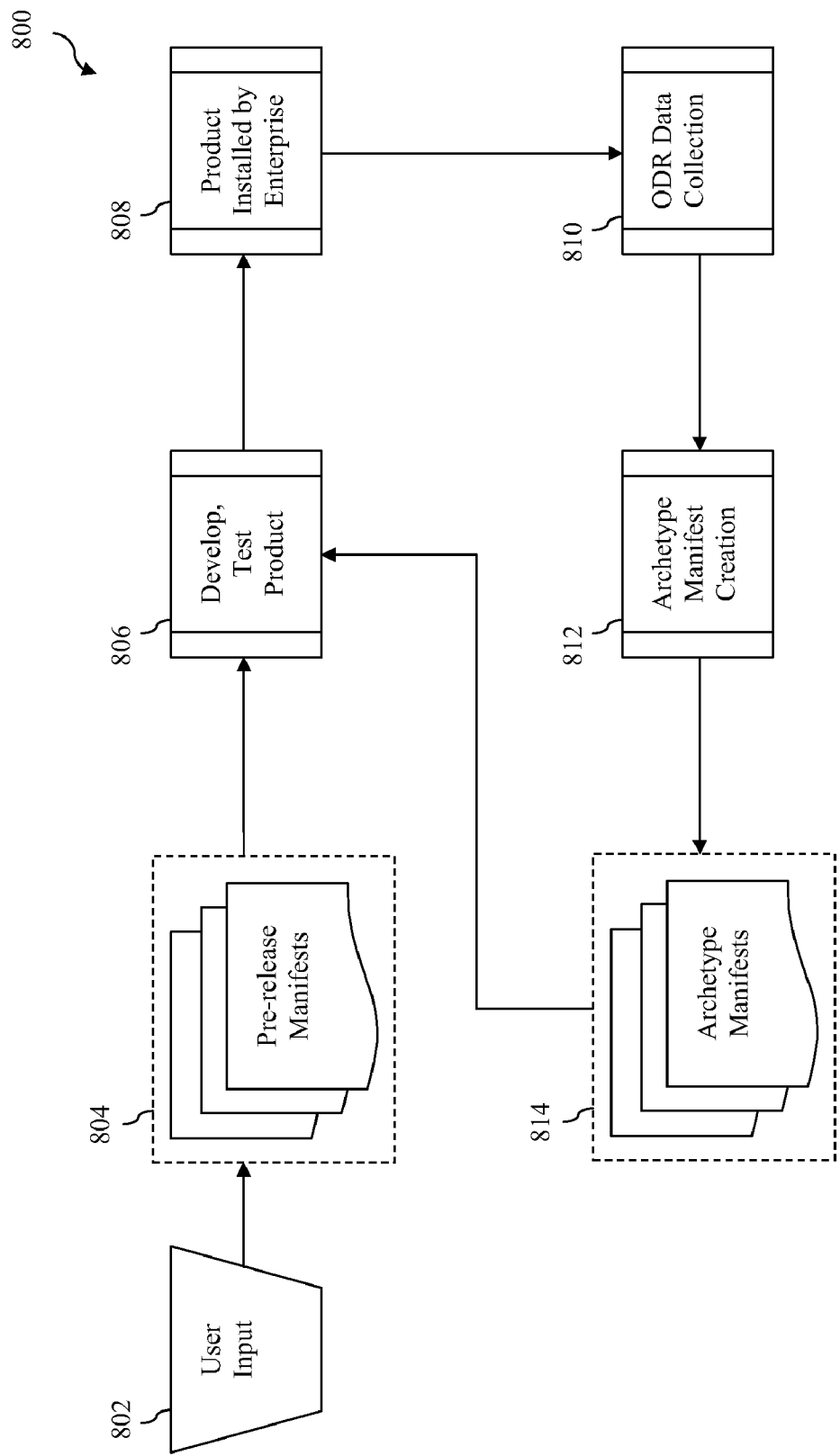
FIG. 8 depicts a dataflow by which manifests may be prepared and refined in accordance with an embodiment of the present invention.

FIG. 8 depicts a dataflow 800 by which manifests may be prepared and refined in accordance with an embodiment of the present invention. As shown in FIG. 8, one or more manifests 804 are generated and then annotated based on user input 802. One process by which a manifest may be generated and annotated by a user was described above in reference to steps 202, 204 and 206 of flowchart 200. Manifests 802 are then provided to a test data generation system (such as test data generation system 100 described above in reference to FIG. 1) to generate test data. The generated test data may then used as part of a test bed for developing and/or testing a software product, as represented by process 806. A plurality of manifests may be used to develop and/or test the software product at a variety of loads and using a variety of test data content.

The foregoing approach is particularly useful when the software product has not yet been released, since in that case there will be no enterprise operational data available from which suitable parameters (e.g., cardinality values and property information) can be derived for annotating manifests 804. In this situation, manifests 804 may be thought of as "pre-release manifests."

After the software product has been released, it is installed by various enterprises as represented by process 808. One or more of these enterprises may elect to participate in an operational data reporting (ODR) process 810 by which operational data generated by and/or associated with the installed software product is collected and transmitted back to the developer of the software product. Such operational data may include, for example, statistics related to one or more repository instance spaces of an enterprise.

An archetype manifest creation process 812 receives the ODR data from a variety of enterprises and analyzes the data to identify different enterprise archetypes or clusters. Mathematical techniques such as k-means may be used to perform this analysis. It is anticipated that enterprises having similar network topologies will fall into the same or similar archetypes or clusters. One example archetype might be enterprises that host Web farms. These enterprises might be identifiable because each of their Web servers shows hundreds or thousands of Web sites per server. Another example archetype might be enterprises deemed to be "early technology adopters." These enterprises might be identifiable because they show computers running predominantly newer operating systems with only a small percentage of computers running older technologies. Still other companies might fit into other archetypes.

Once an archetype has been identified, archetype manifest creation process 812 determines a set of parameters that are representative of a network topology associated with the archetype and inserts the parameters into a manifest in an automated fashion. For example, a set of cardinality rules and property rules may be defined for each identified archetype and then inserted into a manifest. Manifests generated in this manner are denoted archetype manifests 814 in FIG. 8. These manifests are then used to perform further testing of the software product 806.

Because of the operations performed by process 812, each archetype manifest 814 can advantageously be used to generate high-quality test data for a different type of enterprise. This allows more focused product testing 806 to occur for each of the different enterprise types. This in turn enables product testers to identify and resolve problems that are unique to certain types of organizations. Resolution of such problems may include, for example, the release of pre-emptive service patches or the development of new solutions that may be included within future releases of the software product.

It is noted that whether a manifest is created through user annotation (as is the case with pre-release manifests 804) or through an archetype manifest creation process (as is the case with archetype manifests 814), the test data generation system operates in the same manner. However, an advantage of dataflow 800 is that as a software developer iterates through the product release cycle, it can automatically refine its manifests for the next release. Furthermore, since the ODR data returned from the various enterprises to the software developer in accordance with dataflow 800 comprises only high-level statistical information about an enterprise's computer network(s), dataflow 800 advantageously allows for important feedback to be received from the enterprises in a manner that avoids any enterprise confidential information being provided to the software developer or tester.

Enabling users to annotate manifests is particularly desirable for testing features of a software product that enterprises have not yet installed. Likewise, it is desirable to be able to test a software product during its life cycle in as near to the user environment as is possible. For example, although a software product might be specified for 10,000 entities of a particular type, some enterprises may routinely use the software product with 50,000 entities of that type and complain about performance. In accordance with an embodiment of the present invention, if such enterprises send ODR data to the software developer, the software developer will be able to generate test data that will allow the developer to understand what the problem is. Once the developer understands the problem, the developer can suggest ways to fix it. Thus, an embodiment of the present invention allows software developers to reproduce user performance problems, thereby enabling the developers to better test and refine software.

D. Example Computer System Implementation

Figure 9:
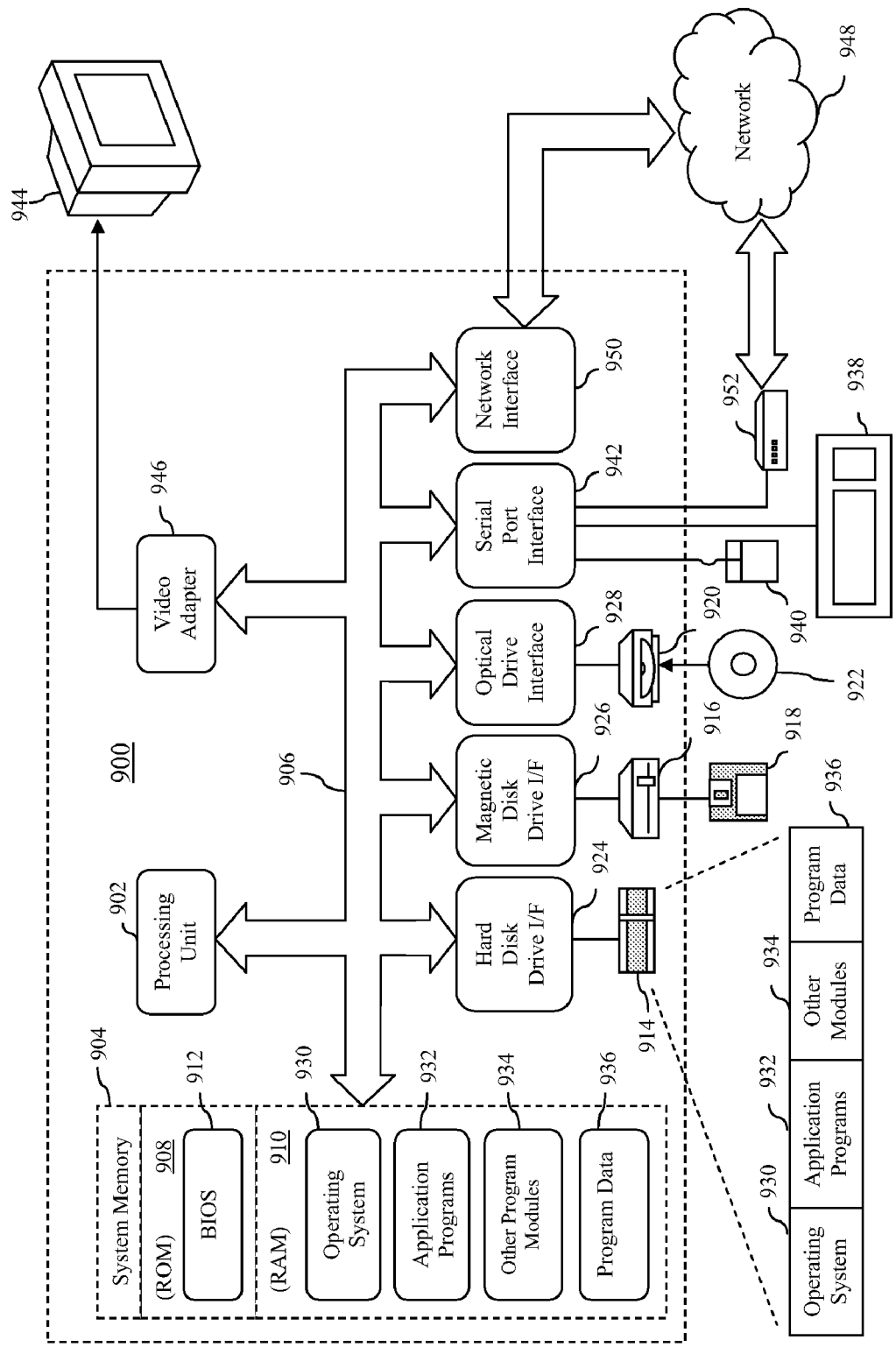
FIG. 9 depicts an example processor-based computer system that may be used to implement various aspects of the present invention.

FIG. 9 depicts an exemplary implementation of a computer system 900 upon which various aspects of the present invention may be executed. Computer system 900 is intended to represent a general-purpose computing system in the form of a conventional personal computer.

As shown in FIG. 9, computer system 900 includes a processing unit 902, a system memory 904, and a bus 906 that couples various system components including system memory 904 to processing unit 902. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computer system 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the server computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 930, one or more application programs 932, other program modules 934, and program data 936. Application programs 932 or program modules 934 may include, for example, logic for implementing any or all of the functional elements of test data generation system 100 as described herein in reference to FIG. 1. Application programs 932 or program modules 934 may also include, for example, logic for implementing one or more of the steps of the flowcharts depicted in FIGS. 2 and 7. Thus each step illustrated in those figures may also be thought of as program logic configured to perform the function described by that step.

A user may enter commands and information into computer 900 through input devices such as keyboard 938 and pointing device 940. Other input devices (not shown) may include a microphone, joystick, game pad, satellite dish, scanner, or the like. These and other input devices are often connected to the processing unit 902 through a serial port interface 942 that is coupled to bus 906, but may be connected by other interfaces, such as a parallel port, game port, or a universal serial bus (USB).

A monitor 944 or other type of display device is also connected to bus 906 via an interface, such as a video adapter 946. Monitor 944 is used to present a GUI that assists a user/operator in configuring and controlling computer 900. In addition to the monitor, computer 900 may include other peripheral output devices (not shown) such as speakers and printers.

Computer 900 is connected to a network 948 (e.g., a WAN such as the Internet or a LAN) through a network interface 950, a modem 952, or other means for establishing communications over the network. Modem 952, which may be internal or external, is connected to bus 906 via serial port interface 942.

As used herein, the terms "computer program medium" and "computer-readable medium" are used to generally refer to media such as the hard disk associated with hard disk drive 914, removable magnetic disk 918, removable optical disk 922, as well as other media such as flash memory cards, digital video disks, random access memories (RAMs), read only memories (ROM), and the like.

As noted above, computer programs (including application programs 932 and other program modules 934) may be stored on the hard disk, magnetic disk, optical disk, ROM, or RAM. Such computer programs may also be received via network interface 950 or serial port interface 942. Such computer programs, when executed, enable computer 900 to implement features of the present invention discussed herein. Accordingly, such computer programs represent controllers of computer 900.

The invention is also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

E. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A computer-implemented method for generating a test bed for developing, testing and/or supporting the use of software, comprising:

receiving a manifest that refers to a type space model of a computer network, the type space model including hardware, software, network and storage entity types, the manifest including an encoding that conveys parameters that can be used to inflate the type space model of the computer network into an instance space model of the computer network;

processing the manifest to create an instance space model of the computer network, creating the instance space model comprising creating multiple instances of each entity type included in the type space model; and storing data representative of the instance space model to a physical storage medium.

2. The method of claim 1, wherein the type space model further includes process data entities.

3. The method of claim 1, wherein the encoding conveys cardinality information that specifies a particular number of entity type instances or relationship type instances to be generated in creating the instance space model.

4. The method of claim 1, wherein the encoding conveys property information that specifies a property to be associated with an entity type instance generated in creating the instance space model.

5. The method of claim 4, wherein the property information includes a variable that is resolved to determine the property to be associated with the entity type instance generated in creating the instance space model.

6. The method of claim 4, wherein the property information includes a function that is executed to determine the property to be associated with the entity type instance generated in creating the instance space model.

7. The method of claim 1, wherein the type space model comprises an object-relational directed graph that describes a plurality of potential directed graph instances and wherein the instance space model comprises one of the plurality of potential directed graph instances.

8. The method of claim 1, further comprising:
extracting metadata describing the type space model from a model repository; and
processing the extracted metadata to generate the manifest.

9. The method of claim 1, further comprising:
adding the parameters to the manifest by editing the manifest via a computer-implemented user interface tool.

10. A computer-implemented method for generating a manifest that refers to a type space model of a computer network, the type space model including hardware, software, network and storage entity types, and that includes an encoding that conveys parameters that can be used to inflate the type space model of the computer network into an instance space model of the computer network, the method comprising:
collecting information about an enterprise network using a network-management software product; and
extracting one or more of the parameters to be conveyed by the encoding included in the manifest from the collected information; and
using the extracted parameter(s) to generate the manifest.

11. The method of claim 10, wherein the collecting step comprises remitting the collected information from an enterprise associated with an enterprise network to a remote entity for creation of the manifest.

12. The method of claim 10, further comprising:
performing the collecting, extracting and using steps with respect to a plurality of different enterprise networks associated with a plurality of different enterprises to generate a plurality of manifests; and
combining two or more of the plurality of manifests to create an archetype manifest.

13. The method of claim 10, wherein combining two or more of the plurality of manifests to create an archetype manifest comprises:
clustering the plurality of manifests based on the parameters conveyed by the encoding in each of the manifests to generate one or more clusters of manifests; and
creating an archetype manifest associated with at least one cluster based on the parameters conveyed by the encoding in each of the manifests included in the cluster.

14. A system for generating a test bed for developing, testing and/or supporting the use of software, comprising:
a type space definition processor configured to receive a manifest and to obtain therefrom a type space model of a computer network and parameters that can be used to inflate the type space model of the computer network into an instance space model of the computer network, wherein the type space model includes hardware, software, network and storage entity types;
an entity engine configured to process the type space model and the parameters to create an instance space model of the computer network, the entity engine being configured to create the instance space model by creating multiple instances of each entity type included in the type space model; and
a database write action module configured to store data representative of the instance space model to a physical storage medium.

15. The system of claim 14, wherein the parameters include cardinality information that specifies a particular number of entity type instances or relationship type instances to be generated in creating the instance space model.

16. The system of claim 14, wherein the parameters include property information that specifies a property to be associated with an entity type instance generated in creating the instance space model.

17. The system of claim 16, wherein the property information includes a function that is executed to determine the property to be associated with the entity type instance generated in creating the instance space model.

18. The system of claim 14, wherein the type space model comprises an object-relational directed graph that describes a plurality of potential directed graph instances and wherein the instance space model comprises one of the plurality of potential directed graph instances.

19. The system of claim 14, further comprising:
a repository metadata reader configured to extract the metadata describing the type space model from a model repository;
wherein the type space definition processor is configured to process the extracted metadata to generate the manifest.

20. The system of claim 14, further comprising:
a user interface configured to allow a user to edit the manifest to add the parameters thereto.

* * * * *